United States Patent
Gazda et al.

(10) Patent No.: US 12,526,186 B2
(45) Date of Patent: Jan. 13, 2026

(54) SHARED-APPLICATION VERTICAL-SESSION-BASED-EDGE-APPLICATION-INSTANCE DISCOVERY AND SELECTION

(71) Applicant: INTERDIGITAL PATENT HOLDINGS, INC., Wilmington, DE (US)

(72) Inventors: Robert Gazda, Spring City, PA (US); Michel Roy, Candiac (CA); Michael Starsinic, Newtown, PA (US); Zhibi Wang, Woodridge, IL (US); Atle Monrad, Froland (NO); Taimoor Abbas, Sainte-Julie (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/723,733

(22) PCT Filed: Mar. 23, 2023

(86) PCT No.: PCT/US2023/016162
§ 371 (c)(1),
(2) Date: Jun. 24, 2024

(87) PCT Pub. No.: WO2023/183538
PCT Pub. Date: Sep. 28, 2023

(65) Prior Publication Data
US 2025/0106100 A1    Mar. 27, 2025

Related U.S. Application Data

(60) Provisional application No. 63/323,396, filed on Mar. 24, 2022.

(51) Int. Cl.
*H04W 92/00*    (2009.01)
*H04L 41/0806*    (2022.01)

(52) U.S. Cl.
CPC .............................. *H04L 41/0806* (2013.01)

(58) Field of Classification Search
None
See application file for complete search history.

(56) References Cited

U.S. PATENT DOCUMENTS

2017/0352019 A1    12/2017 Li et al.
2019/0363899 A1*  11/2019 Christian ............ H04L 65/1069
(Continued)

FOREIGN PATENT DOCUMENTS

| CN | 110198516 A |   | 9/2019 |   |
|----|---|---|---|---|
| CN | 113630266 A | * | 11/2021 | ............. H04L 69/40 |
| WO | 2023039409 A1 |   | 3/2023 |   |

OTHER PUBLICATIONS

Apple, "Pseudo-CR on Solution proposal for Key issue #X: EAS discovery for multi-player sessions," 3GPP TSG-SA WG6 Meeting #47-e, S6-220180, e-meeting (Feb. 14-22, 2022).

(Continued)

*Primary Examiner* — Christopher B Robinson
(74) *Attorney, Agent, or Firm* — Volpe Koenig

(57) ABSTRACT

In one or more embodiments, one or more devices, systems, and/or methods may address solutions and/or innovations for 5G System edge computing, edge applications, and/or other wireless systems. For example, one or more of the following techniques may be used to address shared-application vertical-session-based edge-application-instance discovery and selection: there may be an application vertical-session identifier; one or more application-vertical-session-based EAS registration, discovery, and selection procedures; application-vertical-session-based EDN/EES provisioning; and/or, application-vertical-session management.

14 Claims, 17 Drawing Sheets

(56) References Cited

U.S. PATENT DOCUMENTS

| | | | | |
|---|---|---|---|---|
| 2021/0111953 | A1* | 4/2021 | Hall | H04W 36/322 |
| 2021/0136177 | A1 | 5/2021 | Hall et al. | |
| 2022/0369218 | A1* | 11/2022 | Gupta | H04W 48/18 |
| 2023/0239215 | A1* | 7/2023 | Kim | H04L 67/51 709/223 |
| 2024/0056504 | A1* | 2/2024 | Krishna | H04L 67/141 |
| 2024/0107600 | A1* | 3/2024 | Luetzenkirchen | H04W 16/18 |
| 2024/0373386 | A1* | 11/2024 | Roy | H04W 60/04 |

OTHER PUBLICATIONS

Huawei et al., "Common EAS discovery," 3GPP TSG-SA WG6 Meeting #52-e bis, S6-231095, e-meeting (Jan. 11-20, 2023).

InterDigital, "Evaluation of Solution #28," 3GPP TSG-SA WG6 Meeting #49-e, S6-221489, e-meeting (May 16-25, 2022).

InterDigital, "Resolution of Editor's Note on Acid in Solution#28," 3GPP TSG-SA WG6 Meeting #49-e, S6-221466, e-meeting (May 16-25, 2022).

InterDigital, "Resolution of Editor's Notes on solution #28," 3GPP TSG-SA WG6 Meeting #49-bis-e, S6-221891, e-meeting (Jun. 22-Jul. 1, 2022).

InterDigital, "Resolution of Editor's Notes on solution #28," 3GPP TSG-SA WG6 Meeting #50-e, S6-222497, e-meeting (Aug. 22-31, 2022).

InterDigital, "Solution for KI#17—Common EAS," 3GPP TSG-SA WG6 Meeting #48-e, S6-22954, e-meeting (Apr. 5-14, 2022).

Third Generation Partnership Project, "Technical Specification Group Services and System Aspects; Study on Enhanced architecture for enabling Edge Applications; (Release 18)," 3GPP TR 23.700-98 V0.5.1 (Mar. 2022).

Third Generation Partnership Project, "Technical Specification Group Services and System Aspects; Study on Enhanced architecture for enabling Edge Applications; (Release 18)," 3GPP TR 23.700-98 V18.0.0 (Dec. 2022).

Third Generation Partnership Project, "Technical Specification Group Core Network and Terminals; Enabling Edge Applications; Protocol specification; (Release 17)," 3GPP TS 24.558 V17.2.0 (Dec. 2022).

Third Generation Partnership Project, "Technical Specification Group Core Network and Terminals; Enabling Edge Applications; Protocol specification; (Release 17)," 3GPP TS 24.558 V1.2.0 (Feb. 2022).

Third Generation Partnership Project, "Technical Specification Group Services and System Aspects; Architecture for enabling Edge Applications; (Release 17)," 3GPP TS 23.558 V17.3.0 (Mar. 2022).

Third Generation Partnership Project, "Technical Specification Group Services and System Aspects; Architecture for enabling Edge Applications; (Release 17)," 3GPP TS 23.558 V17.2.0 (Dec. 2021).

Third Generation Partnership Project, "Technical Specification Group Services and System Aspects; Architecture for enabling Edge Applications; (Release 18)," 3GPP TS 23.558 V18.1.0 (Dec. 2021).

Third Generation Partnership Project, "Technical Specification Group Services and System Aspects; Architecture for enabling Edge Applications; (Release 17)," 3GPP TS 23.558 V17.6.0 (Dec. 2022).

Third Generation Partnership Project, "Technical Specification Group Services and System Aspects; System architecture for the 5G System (5GS); Stage 2 (Release 17)," 3GPP TS 23.501 V17.4.0 (Mar. 2022).

Third Generation Partnership Project, "Technical Specification Group Services and System Aspects; System architecture for the 5G System (5GS); Stage 2 (Release 17)," 3GPP TS 23.501 V17.3.0 (Dec. 2021).

Third Generation Partnership Project, "Technical Specification Group Services and System Aspects; System architecture for the 5G System (5GS); Stage 2 (Release 17)," 3GPP TS 23.501 V17.7.0 (Dec. 2022).

Third Generation Partnership Project, "Technical Specification Group Services and System Aspects; System architecture for the 5G System (5GS); Stage 2 (Release 18)," 3GPP TS 23.501 V18.0.0 (Dec. 2022).

Huawei et al., "Adding missing events for ACR notifications," 3GPP TSG-SA WG6 Meeting #47-e, S6-220382, e-meeting (Feb. 14-22, 2022).

* cited by examiner

Example EAS Registration Procedure

Example Service Provisioning Subscription

Example Service Provisioning – Request/Response

SHARED-APPLICATION VERTICAL-SESSION-BASED-EDGE-APPLICATION-INSTANCE DISCOVERY AND SELECTION

CROSS REFERENCE TO RELATED APPLICATIONS

This application is the U.S. National Stage, under 35 U.S.C. § 371, of International Application No. PCT/US2023/016162 filed Mar. 23, 2023, which claims the benefit of U.S. Provisional Application No. 63/323,396, filed Mar. 24, 2022 the contents of which are incorporated herein by reference.

SUMMARY

In one or more embodiments, one or more devices, systems, and/or methods may address solutions and/or innovations for 5G System, edge computing, edge applications, and/or other wireless systems. For example, one or more of the following techniques may be used to address shared-application vertical-session-based-edge-application-instance discovery and selection: there may be an application vertical-session identifier (may also be called a "group identifier"); one or more application vertical-session-based EAS registration, discovery, and selection procedures; application vertical-session-based EDN/EES provisioning; and/or, application vertical-session management.

In one or more embodiments, a method implemented by a server includes: receiving, from a plurality of wireless transmit receive units (WTRUs), information related to a common application; sending a common multi-user group identifier (ID) to the plurality of WTRUs in response to receiving the information; receiving a request that indicates the common multi-user group ID; and sending an indication of one or more server instances associated with the common multi-user group ID.

In one or more embodiments, a method implemented by a wireless transmit receive unit (WTRU) includes: sending, to a server, a message indicating a common multi-user group identifier (ID); receiving an indication of one or more server instances associated with the common multi-user group ID; and connecting to the one or more server instances.

In one or more embodiments, a server is configured to: receive, from a plurality of wireless transmit receive units (WTRUs), information related to a common application; to send a common multi-user group identifier (ID) to the plurality of WTRUs in response to receiving the information; to receive a request that indicates the common multi-user group ID; and to send an indication of one or more server instances associated with the common multi-user group ID.

In one or more embodiments, a WTRU is configured: to send, to a server, a message indicating a common multi-user group identifier (ID); to receive an indication of one or more server instances associated with the common multi-user group ID; and to connect to the one or more server instances.

In one or more embodiments, a method implemented by a server includes: receiving, from a wireless transmit-receiving unit (WTRU), a request that one or more edge-application-server (EAS) instances be configured to run a session common to an application client located on the WTRU and to at least one other application client located on the WTRU or on another WTRU; and associating the one or more EAS instances with a multi-user group ID.

In an embodiment, a server is configured: to receive, from a wireless transmit-receiving unit (WTRU), a request that one or more edge-application-server (EAS) instances be configured to run a session common to an application client located on the WTRU and to at least one other application client located on the WTRU or on another WTRU; and to associate the one or more EAS instances with a multi-user group ID.

BRIEF DESCRIPTION OF THE DRAWINGS

A more detailed understanding may be had from the following description, given by way of example in conjunction with the accompanying figures, wherein like reference numerals in the figures indicate like elements.

DETAILED DESCRIPTION

As listed in Table 1 below, one or more of the following abbreviations and/or acronyms may be used.

TABLE 1

Example Acronyms

| | |
|---|---|
| AC | Application Client |
| ACID | Application Client Identification |
| ACF | ACR Coordination Function |
| ACR | Application Context Relocation |
| ACT | Application Context Transfer |
| AMF | Access and Mobility Management Function |
| API | Application Programing Interface |
| AS | Application Server |
| ASF | ACR Selection Function |
| AVSID | Application Vertical Session Identifier (may also be called an "Application Vertical Group Identifier") |
| DN | Data Network |
| DNN | Data Network Name |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EEL | Edge Enabler Layer |
| EES | Edge Enabler Server |
| LADN | Local Area Data Network |
| PLMN | Public Land Mobile Network |
| SCP | Service Continuity Planning |
| S-EAS | Source Edge Application Server |
| S-EES | Source Edge Enabler Server |
| TA | Tracking Area |
| T-EAS | Target Edge Application Server |
| T-EES | Target Edge Enabler Server |
| UE | User Equipment |
| URI | Uniform Resource Identifier |

Figure 1A:
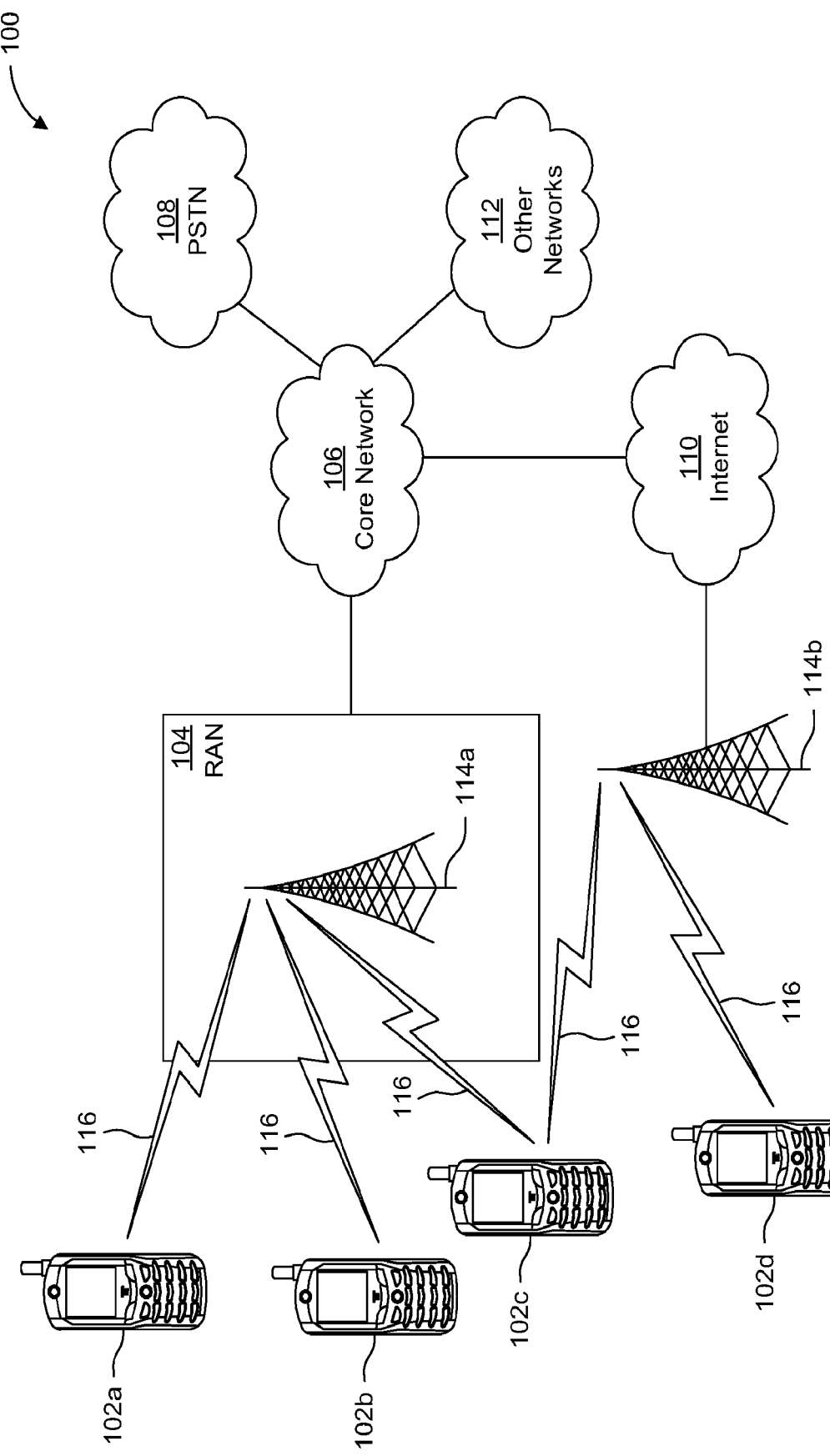
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
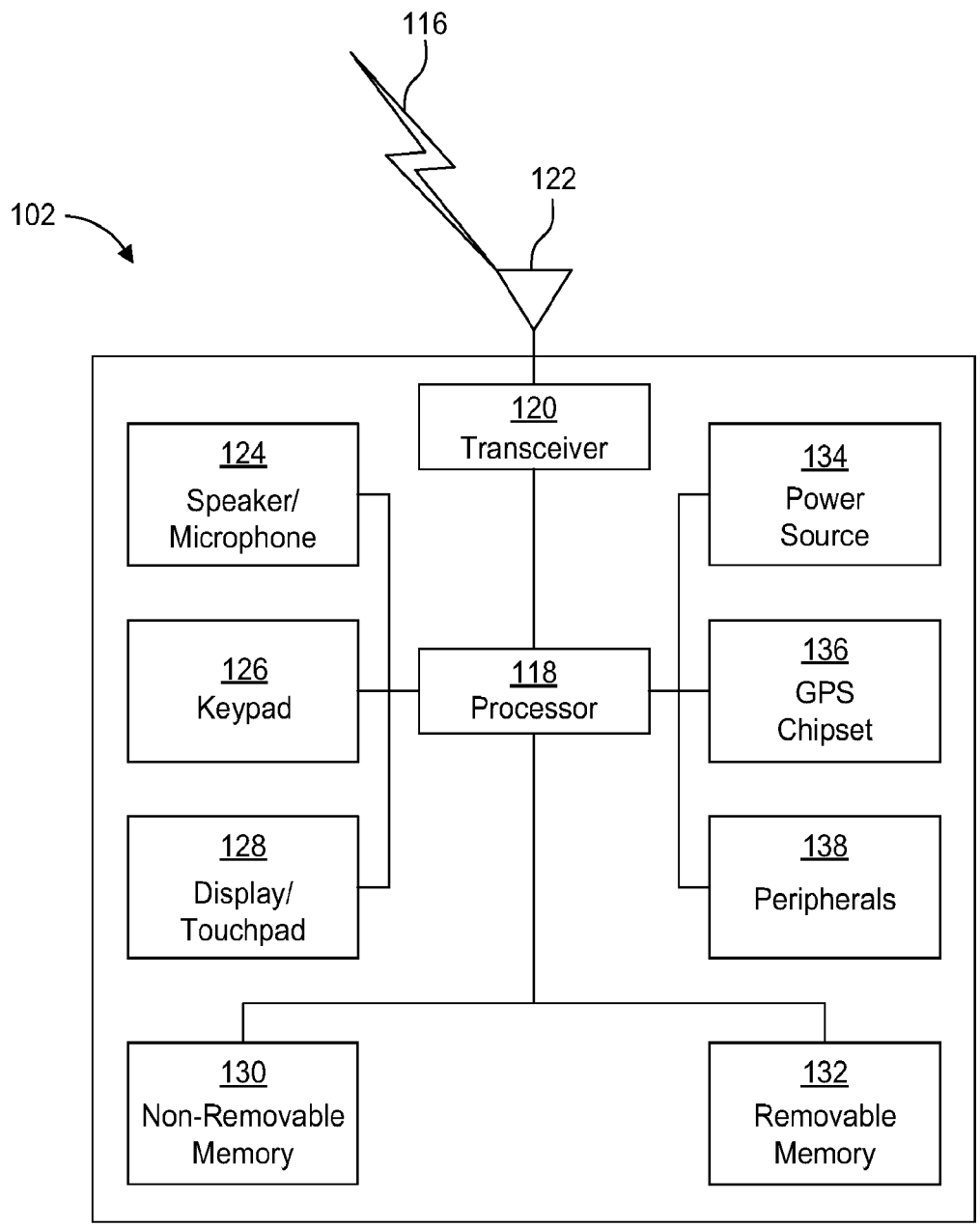
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
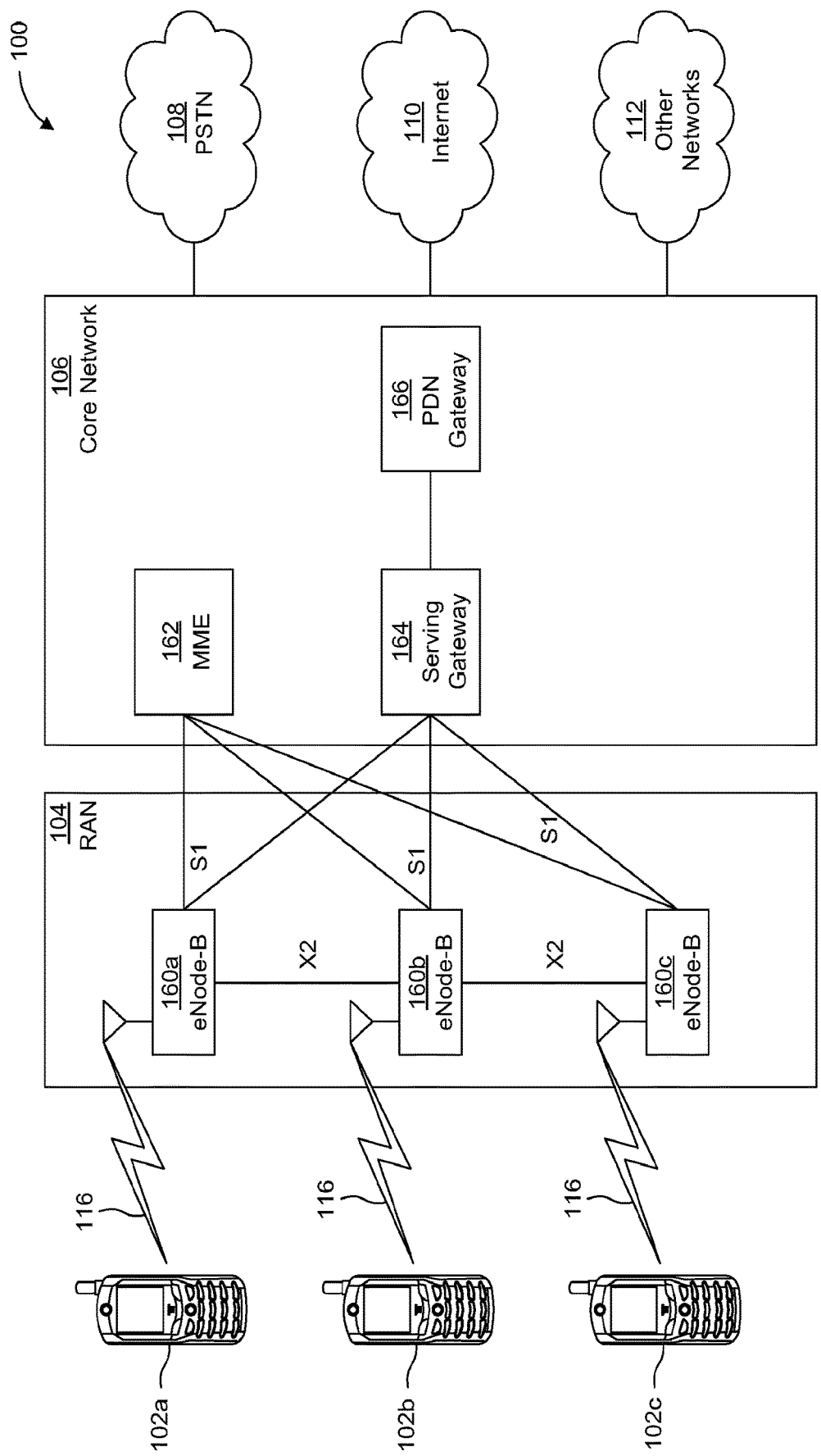
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
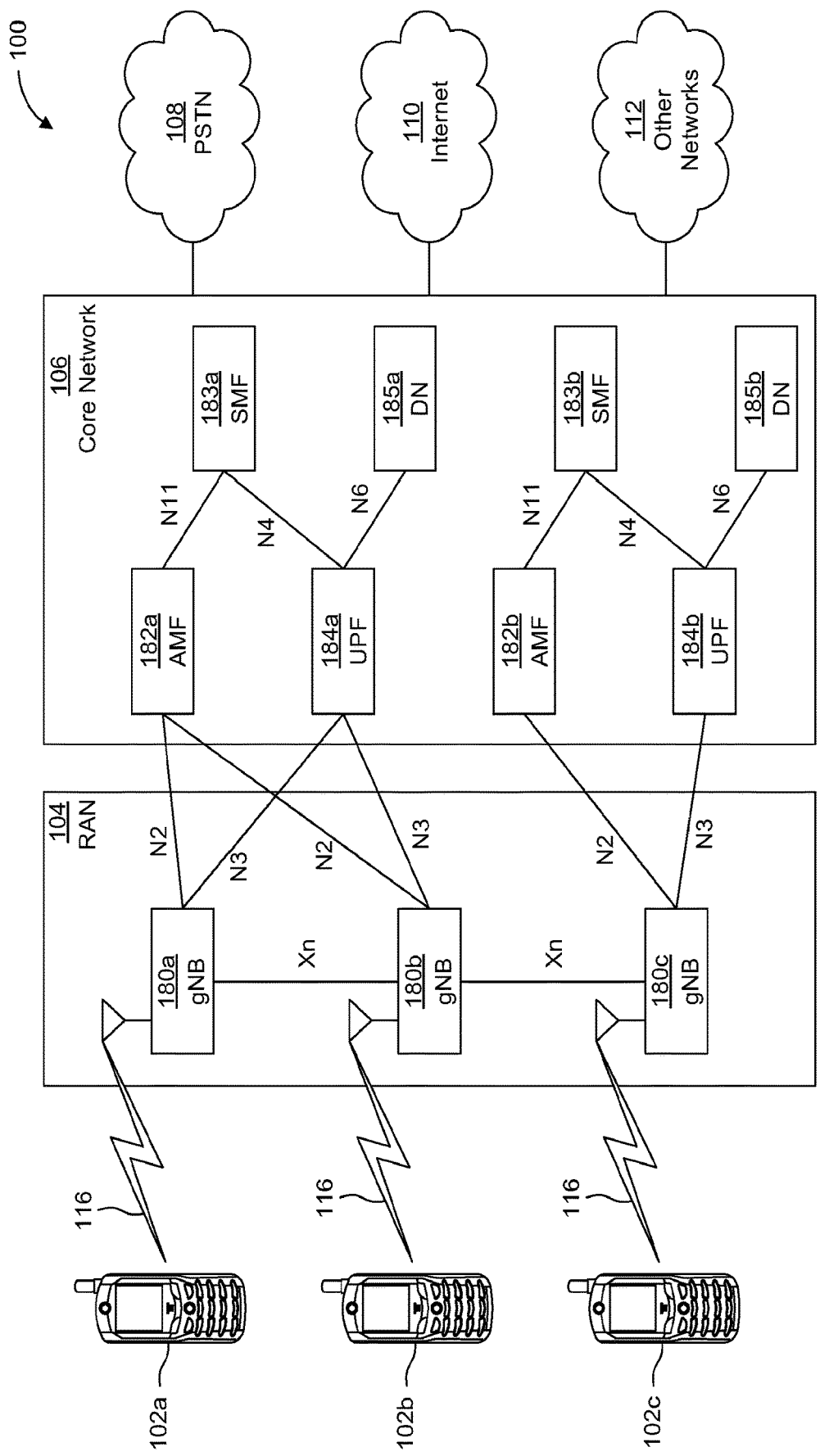
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
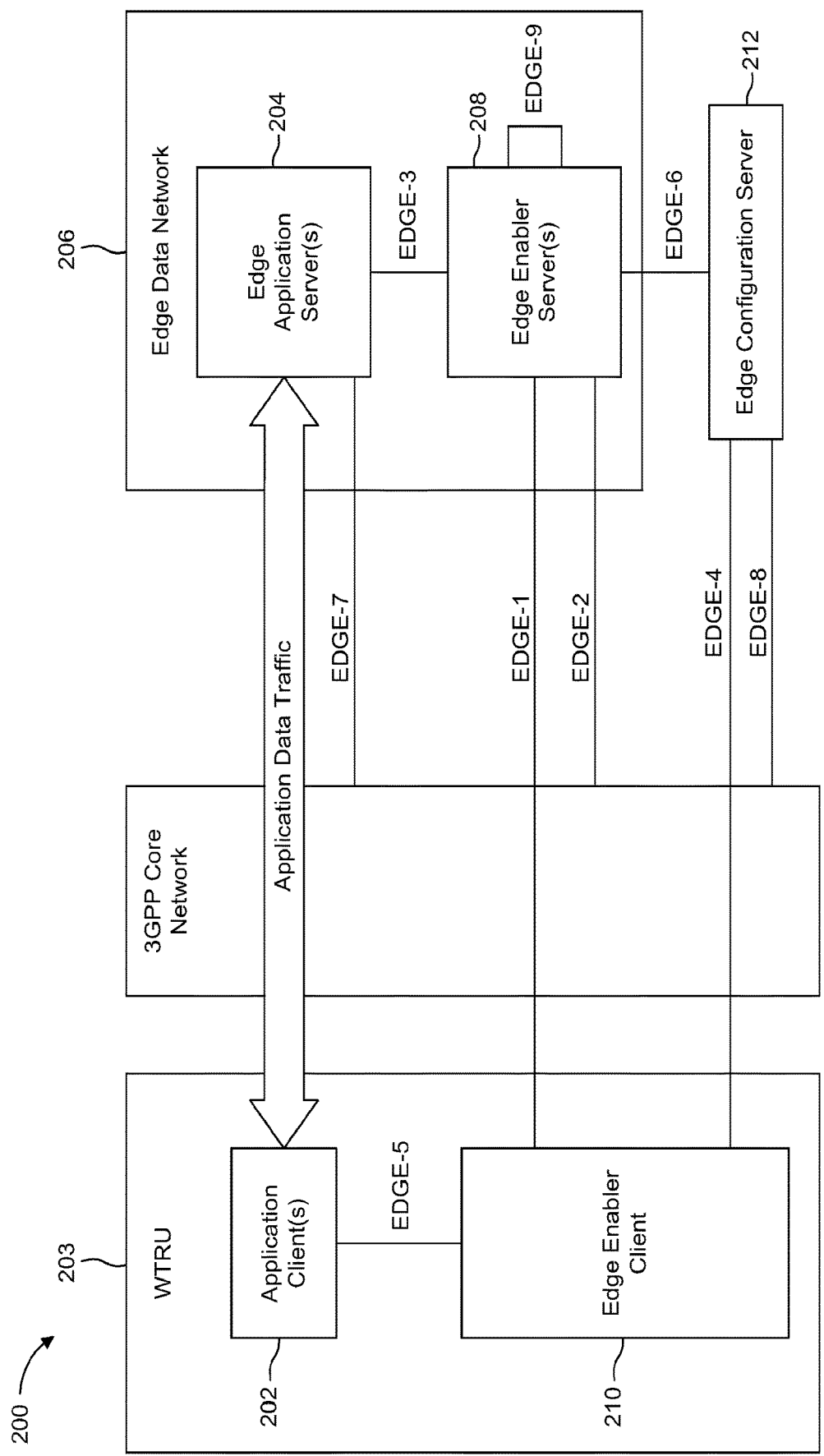
FIG. 2 illustrates an example of a system architecture of edge computing between a device and an edge data network.

FIG. 2 illustrates an example architecture 200 for enabling edge applications. Generally, system aspects for wireless systems (e.g., SA6), may address application-layer-architecture specifications for standardized verticals, including architecture requirements, functional architecture, procedures, information flows, interworking with non-3GPP application-layer solutions, and/or deployment models as appropriate. As shown, there are several components of the example architecture 200 that are further discussed in Table 2 below.

TABLE 2

Example components of the example architecture of FIG. 2

| | |
|---|---|
| Application Client (AC) 202 | User application residing on a WTRU 203; for the purpose of this disclosure the AC 202 may be an application that communicates with an Edge Application Server (EAS) 204. Cardinality: a WTRU may use several ACs 202 concurrently |
| Edge Data Network (EDN) 206 | Local Data Network that supports the Edge Enablement Layer, containing Edge Enabler Servers (EES) 208 and Edge Application Servers |

TABLE 2-continued

Example components of the example architecture of FIG. 2

| | |
|---|---|
| | (EAS) 204 An EDN 206 may contain multiple EES 208 and EAS 204 instances, offered by one or more Edge Computing Service Providers |
| Edge Enabler Client (EEC) 210 | Provides edge support to the ACs 202 on the WTRU 203 Cardinality: one or more EEC 210 per WTRU 203; one AC 202 uses one EEC 210 |
| Edge Configuration Server (ECS) 212 | Provides supporting functions needed for EEC 210 or Edge Enabler Servers (EES) 208 to discover EES(es) providing certain EAS 204 Cardinality: one or more ECS 212 for the network. |
| Edge Enabler Server (EES) 208 | Provides supporting functions needed for Edge Application Servers (EAS) 204 and Edge Enabler Client (EEC) 210. In the context of a mobility/service continuity use case: the Source-EES (S-EES) 208 is the EES used before mobility/ACR happens the Target-EES (T-EES) 208 is the EES used after mobility/ACR has happened. Cardinality: there is one or more EES 208 per EDN (Edge Data Network - aka DNN) 206 - there are multiple EDNs 206 in the network |
| Edge Application Server (EAS) 204 | Application server resident in the EDN 206, it is the software server providing a service to the Application Client 202. In the context of a mobility/service continuity use case: the Source-EAS (S-EAS) 204 is the EAS used before mobility/ACR happens the Target-EAS (T-EAS) 204 is the EAS used after mobility/ACR has happened Cardinality: there are multiple EAS 204 per EDN 206 - each EDN 206 may contain a different set of EASs 204; some EAS 204 may serve a group of ACs 202/WTRUs 203 while some may be exclusive to a single AC 202/WTRU 203. |

In some cases, an application service provider, or edge computing service provider, may deploy several instances of an Edge Application Server (EAS) 204 within a single Edge Data Network (EDN) 206 or across several EDNs. An EAS 204 may provide application-level specific functions to Application Clients (AC) 202 on terminals (e.g., WTRUs 203). An AC 202 may connect to an EAS 204 in order to utilize available services of the application with the benefits of edge computing. A single AC 202 may be associated with one and only one Edge Enabler Client (EEC) 210.

An Edge Enabler Layer (EEL) may provide one or more identifiers for AC's 202 and EAS's 204, as provided in the example of Table 3 below.

TABLE 3

Example identifiers for AC(s) 202 and EAS(s) 204

| | |
|---|---|
| Edge Application Server Identification (EASID) | EASID identifies a "type" of EAS 204. Multiple EAS's 204 with the same EASID may exist in an EDN 206, across EDNs, etc. Multiple EAS's 204 with the same EASID may be registered to a single EES 208, be registered to multiple EESs within an EDN 206, or be registered to EESs in separate EDNs An EASID does not identify an EAS 204 instance. |
| Application Client Identification (ACID) | ACID identifies a "type" of AC 202. Multiple ACs 202 with the same ACID may exist on a single WTRU 203, associated with a single EEC 210 or separate EEC's Multiple ACs 202 with the same ACID may exist on a multiple WTRUs 203 connected to an EDN 206 (same EES 208 or different EESs). Multiple ACs 202 with the same ACID may exist on |

TABLE 3-continued

Example identifiers for AC(s) 202 and EAS(s) 204 a multiple WTRUs 203 connected to a separate
EDNs 206.
An ACID does not identify an AC 202 instance.

Figure 3:
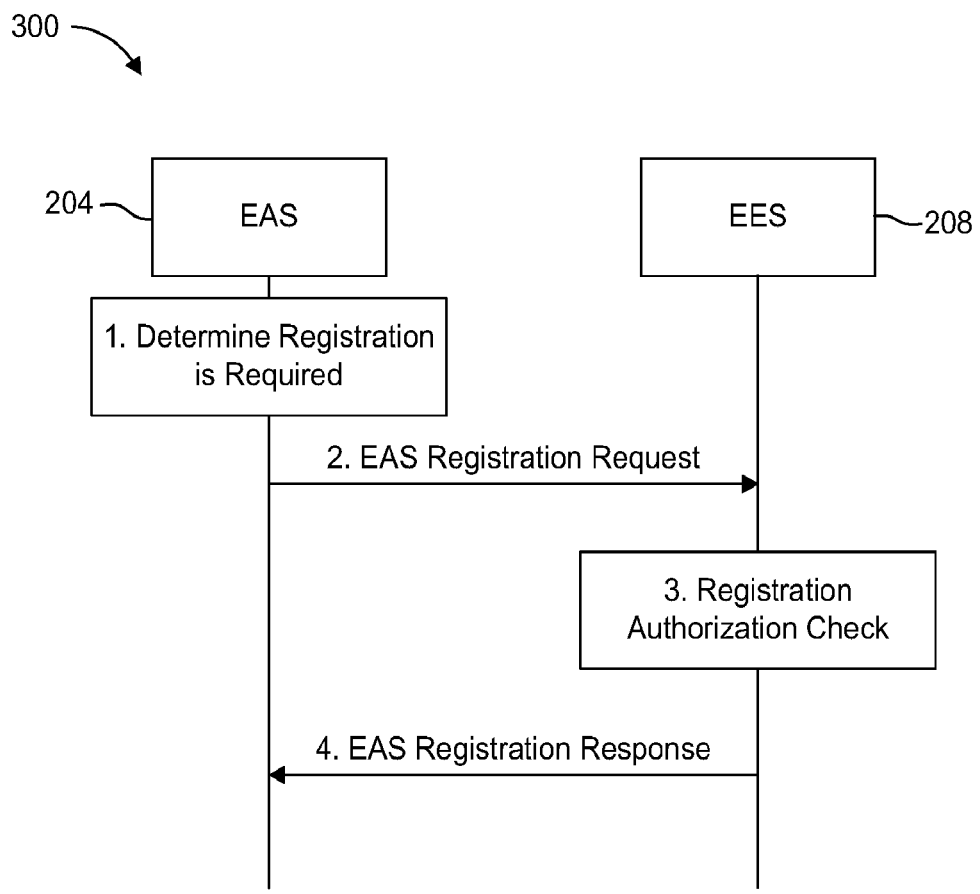
FIG. 3 illustrates an example of an EAS registration procedure.

An EAS 204 registration procedure(s), such as the example registration procedure 300 shown in FIG. 3, may enable an EAS instance to inform, update, and/or delete its information with the EEL, via an EES 208, to enable its discovery by ACs 202. An EAS 204 instance may register with one (e.g., in some cases only one) EES 208, providing the EAS information is described in an EAS Profile. The EAS 204 profile may or may not include information that uniquely identifies an EAS instance. For example, the EAS 204 Endpoint element within the EAS 204 Profile may be used to provide information for an AC 202 to communicate with an EAS. The EAS 204 Endpoint may be some identifier, such as a FQDN or URI, that may be shared with multiple EAS instances. Additionally, the EAS 204 Profile may not include any information that identifies application vertical sessions or AC 202 instances that any given EAS may be serving or available to serve.

Figure 4:
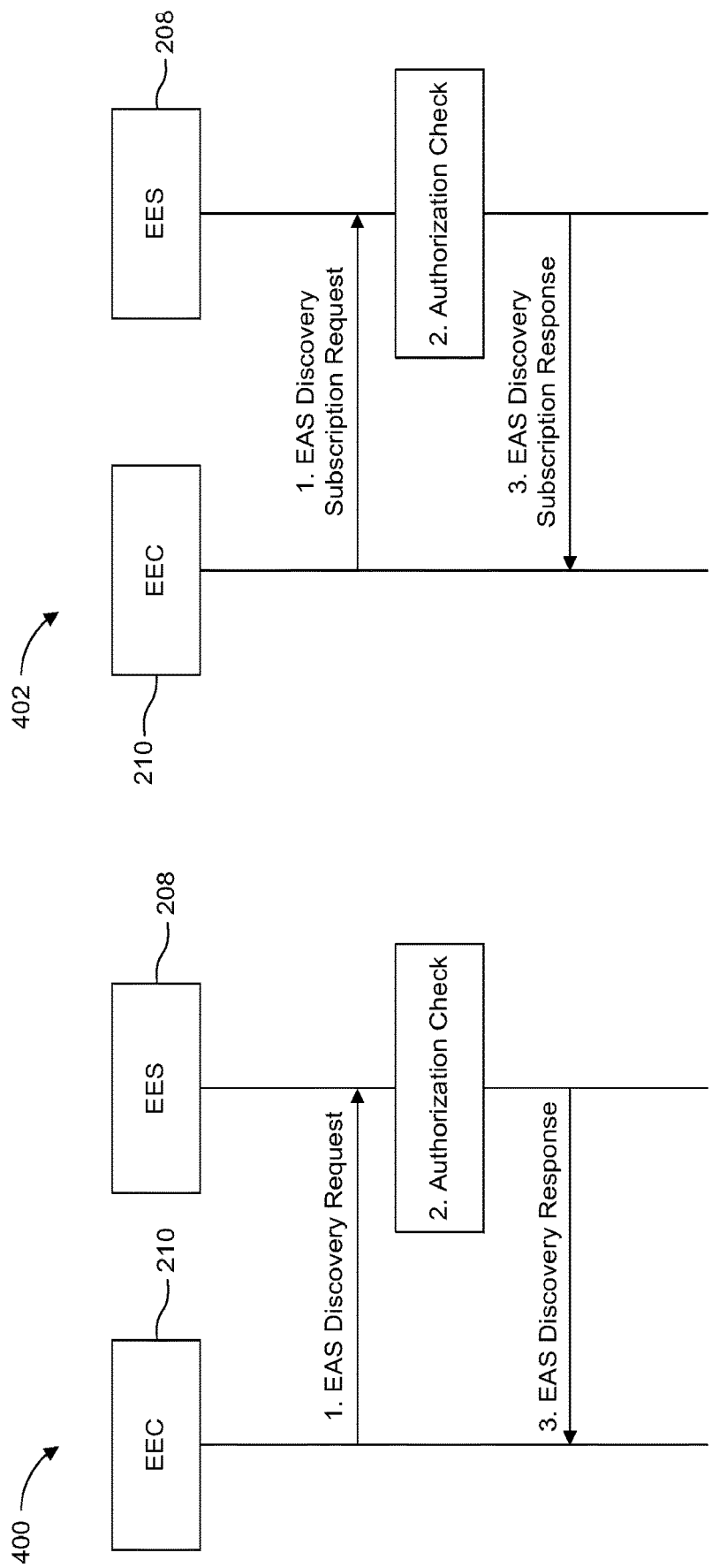
FIGS. 4a-4b illustrate examples of an EAS discovery procedure.

An EAS discovery procedure(s), such as the examples 400 and 402 shown in FIGS. 4a and 4b, respectively, may enable an EEC 210 to discover EASs 204 by interacting with an EES 208 in an EDN 206. The EEC 210 may select one or more discovered EASs 204 and expose selected EASs to an AC 202. The discovery of an EAS 204 may be based on matching EAS discovery filters provided by the EEC 210 with EAS profiles registered at the EES 208. For example, some EAS 204 discovery procedures may include: a synchronous query (request-response procedure); and/or, an asynchronous notification (Subscribe-notify procedures). FIGS. 4a and 4b may apply to both options, respectively. Further, for both options, the EAS 204 discovery filters may be provided by the EEC 210, and may include a list of AC 202 characteristics and/or a list of EAS characteristics. The EAS 204 discovery filters may not include any ability to identify a specific instance of an EAS for selection or to identify an EAS instance serving or available to serve specific application vertical sessions. As described herein, an EAS 204 discovery filter may include one or more information elements, such as: a list of AC 202 characteristics; AC profile; list of EAS 204 characteristics; EASID; EAS provider identifier; EAS type; EAS schedule; EAS geographical service area; EAS topological service area; service continuity support; service permission level; service feature. One or more of these filters may be optional, and one or more of the filters may be mandatory.

In some cases, the EEL may not define how an AC 202 registers or identifies EAS 204 discovery/selection parameters to the EEC 210, via the EDGE-5 reference point. In other cases, there may be (pre)configured parameters. For example, how an AC 202 provides to the EEC 210 the information needed to identify an appropriate EAS 204 instance for connection, specifically its AC Profile, may need to be determined in order to address current and future needs of such a wireless system. The AC 202 Profile may not include any application vertical-session or context information or EAS-instance identification information for EAS discovery and selection for communication.

Figure 5:
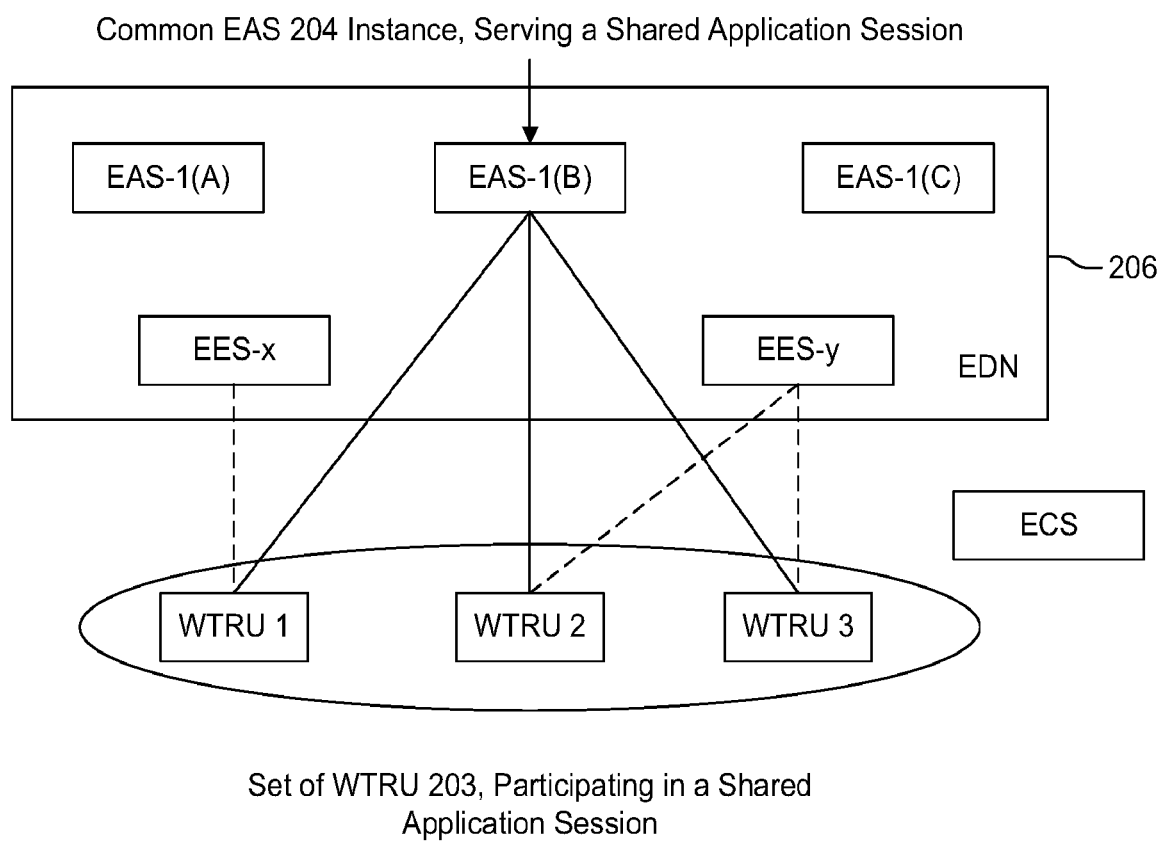
FIG. 5 illustrates an example of several EASs deployed in different locations of the same EDN.

FIG. 5 illustrates an example of several EASs 204 (labeled EAS-1A, EAS-1(B), and EAS-1(C) in FIG. 5, although the example contemplates fewer or more than three EASs) deployed in different locations of the same EDN 206. For many applications, a set of ACs 202 may need to interface with a common EAS 204 instance, if they are participating in a shared-application vertical session or context. This may include ACs 202 on the same WTRU 203 or separate WTRUs 203 (labeled WTRU1, WTRU2, and WTRU3 in FIG. 5, although the example contemplates fewer or more than three WTRUs), for a single user or multiple users, and connected to a common EDN 206 or different EDNs 206.

In some cases, the EEL may not provide an any capability for a set of ACs 202 or WTRUs 203 to discover and select a common EAS 204. This may be an issue, and may need to be addressed by one or more approaches, as discussed herein (e.g., discovery of a common EAS 204). This issue may raise one or more questions: First, whether and how the ACs 202/EECs 210 of different users (e.g., different WTRUs 203) can select or be provisioned the same EAS 204 within an EDN 206? Second, whether and how the ACs 202/EECs 210 of different users (e.g., different WTRUs 203) can select or be provisioned a common EAS 204, even if initially the EECs 210 are communicating with different EDNs 206? Third, whether and how the EEL can support service continuity to ensure that when ACs 202 require the use of service from a common EAS 204 and an ACR operation is needed, ACR operations can be coordinated so that upon completion of the ACR operations the ACs again have services provided by a common EAS.

In one or more embodiments, the above questions may be addressed herein.

Some examples of application verticals that require a set of ACs 202/WTRUs 203 to participate in a shared-application vertical session with a common EAS 204 instance are listed, non-exhaustively, in Table 4 below.

TABLE 4

Examples of application verticals that typically require
a set of ACs 202/WTRUs 203 to participate in a shared-application
vertical session with a common EAS 204 instance 1. Multiplayer Gaming:
   Multi-player games may be composed of terminal-side components
   (AC 202) (one or more per player), backend micro-services (AS)
   in the cloud, and edge components (EAS 204).
   Gaming edge components may include low-latency gameplay
   dynamics and player action coordination functions.
   Games typically include a "match-making" function that gathers
   game "play requests" from players (WTRUs 203) and creates a
   unique "game instance" for a set of players to compete.
   Individual players may not know each other at all.
   For a match (or set of matches), an EAS 204 instance may be
   deployed in an EDN 206 to serve the set of players engaged in
   the match (e.g., engaged in a "application vertical session")
   In some cases, all ACs 202 within a match must interact with
   a common EAS 204.
2. Edge-Native or Edge-Assisted Cooperative Learning:
   Edge enables constrained devices (e.g., WTRUs 203) to participate
   in unsupervised model training (federated learning, FL), where
   their limited resources (e.g., memory, processing, battery) do
   not support Neural Network (NN) training operations.
   A FL-assisting EAS 204 instantiates a NN based on an application
   domain configuration
   The FL-assisting EAS 204 accepts observations from
   participating devices, performs forward path propagation to
   generate an output action, and performs back propagation
   based on the received reward.
   Each participating device creates an observation, performs
   the output action, and computes the observed reward from the
   action. However, the device is freed from performing the
   resource consuming forward and back propagation NN steps.
   The FL-assisting EAS 204 performs training for multiple
   devices (e.g., WTRUs 203) simultaneously (cooperative learning), TABLE 4-continued Examples of application verticals that typically require
a set of ACs 202/WTRUs 203 to participate in a shared-application
vertical session with a common EAS 204 instance and requires the participating devices to interact with the
common FL-assisting EAS 204, that is performing their specific
training.
Furthermore, a single device (e.g., WTRU 203) may be
participating in one or more training sessions. As such a
single device (e.g., WTRU 203) may have multiple ACs 202
interacting with separate FL-assisting EAS 204 instances
of the same or different EAS types (or EASIDs).

3. AR/XR Interactive Experiences:
Highly interactive AR/XR experiences resemble characteristics
of multiplayer gaming, users interact in a shared experience.
They include functions (such as environment sensing and scene
rendering) that typically require high-levels of processing
(CPU and GPU) coupled to low-latency execution requirements.
These functions typically require edge deployment.
Additionally, these functions can also be shared between
participants to improve efficiency (networking and compute
loads) and the realized XR experience, typically requiring
common or shared applications sessions between AR/XR
participants and their devices.
Within a space, multiple XR experiences may be on-going
between different users. Additionally, within a single XR
experience, several application vertical sessions may be
ongoing towards a pool of XR edge resources. As such, a
single-terminal device may be participating in several
separate-application vertical sessions to a common set of
EAS 204 instances.
Identifying EAS-instance selection with WTRU-level
identification parameters may be insufficient.

There may be one or more approaches to common-EAS-instance discovery and selection. In one instance, (e.g., specifically addressing multiplayer games) each AC 202 on all WTRUs 203 participating in a game instance may learn the identities of all the other WTRUs in the game and their locations. Each EEC 210 may send this information (e.g., list of WTRUs 203 with location) to the EES 208 for common EAS 204 discovery. This approach may require sensitive information (e.g., identity and location) to be shared with all ACs 202 and WTRUs 203, which can be a security and privacy risk when players are not known and trusted. Additionally, this embodiment does not enable a single WTRU 203 (e.g., a gaming console or hub device) to be engage in two or more separate game sessions served by different EAS 204 instances.

In a second instance, for EAS 204 discovery for different users, there may be EEL service differentiation that is focused on how an ECSP can provide edge-service quality levels (e.g., premium users vs. normal users). An EAS 204 may provide a list of WTRU 203 Identifiers to the EES 208 that can be used in EAS selection/discovery. This list could be used to match WTRUs 203 in the list to a common EAS 204 instance. However, this may expose sensitive information (e.g., WTRU 203 identifiers) at an application level (EAS 204). How the EAS 204 learns the set of WTRU 203 identifiers may still need to be addressed. Finally, this approach does not enable a single WTRU 203 (e.g., a gaming console or hub device) to be engage in two or more separate game sessions served by different EAS 204 instances.

In legacy cases, EAS 204 discovery and selection does not take into consideration any information on application vertical sessions. An application vertical session is a set of ACs 202 and EASs 204 participating in a broader application vertical deployment (e.g., common multi-user, multi-device, or multi-client session). EAS 204 discovery and selection in such cases may only consider non-application vertical session information, such as EAS type (EASID), AC type (ACID), Service KPIs (e.g., bandwidth, request rate, response time, etc.), EEC ID, WTRU 203 Identifier, etc. As a result, these legacy EAS 204 discovery-and-selection procedures are executed independently for each AC 202 and EEC 210, with little or no ability to ensure that a set of ACs participating in a common application vertical session can receive service from a common EAS 204.

Accordingly, there is a need for techniques that address, for example, discovery of a common EAS 204 (e.g., how the ACs/EECs of different users can select or be provisioned the same EAS). It may also be relevant to address any additional shortcomings, such as: where a technique requires that privacy and security sensitive information, such as WTRU 203 identities, WTRU location, etc., is shared at the application-level (with ACs 202, EASs 204, and application-layer servers in the cloud); additionally, where techniques do not differentiate the application vertical-session level and AC 202 level (e.g., limiting the ability of separate ACs on a single device to interact with separate EAS 204 instances). In considering these shortcomings, additional factors may also be addressed, such as: How to enable different ACs 202 located on the same or different WTRUs 203 and of the same or different types to engage in a common application vertical session; How to enable the discovery and selection of a common EAS 204 instance for a set of ACs 202 participating in an application vertical session, while maintaining privacy (i.e., not exposing sensitive information, like identity and location between ACs, EASs, or WTRUs 203); How can the EEL assist in creating an application vertical session.

In one or more embodiments, the above issues/questions may be addressed in one or more devices, systems, and/or methods. For example, one or more of the following techniques may be used to address shared application vertical-session-based edge-application instance discovery and selection: there may be an application-vertical-session-identifier; one or more application-vertical-session-based EAS 204 registration, discovery, and selection procedures; application-vertical-session-based EDN/EES provisioning; and/or, application-vertical-session management.

An Application Vertical Session Identifier (ASVID) identifies a "common multi-user session" and may be used by an EEL to assist in the management of an application vertical session, including the discovery and selection of a common EAS 204 (or group of common EASs) for the set of AC's 202 participating in a session. "Multi-user" may include any combination of ACs 202 and EECs 210 on one or more WTRUs 203. It does not imply a human user although it may be a human user.

Application-vertical-session-based EAS 204 registration, discovery, and selection are enhanced EEL procedures that specially consider ASVIDs as input. An EAS 204 that supports application vertical sessions signals to the EEL (e.g., EES 208) during registration (including updates) the application-vertical-session identifiers that the EAS is serving. Similarly, an AC 202 may signal to the EEL (e.g., EES 208) with which application vertical sessions the client (AC) will be participating via the EEC 210. With application-vertical-session identification, the EEC 210 and EES 208 may be able to match AC/WTRU EAS 204 discovery and selection requests with the appropriate EAS instances serving their requested application vertical sessions.

Application-vertical-session-based EDN/EES provisioning is an enhanced procedure that selects an EDN 206 for connection by a WTRU 203 based on its AC 202 application-vertical-session requirements. The ECS 212 may utilize these requirements to select an EDN 206 and EES 208 combination for an EEC 210, based on the availability of application vertical sessions that are served by EASs 204. If an EAS 204 is not available to serve an application vertical session in an EDN 206 on a provisioning request, the ECS 212 may signal a notification to a subscribed EEC 210 with a service provisioning notification if an EAS becomes available to service the requested application vertical session at a later time.

Application-vertical-session management is a procedure that allows a WTRU 203 to create an application vertical session in the EEL and allows other WTRUs to learn about application vertical sessions available in the EEL.

Figure 6:
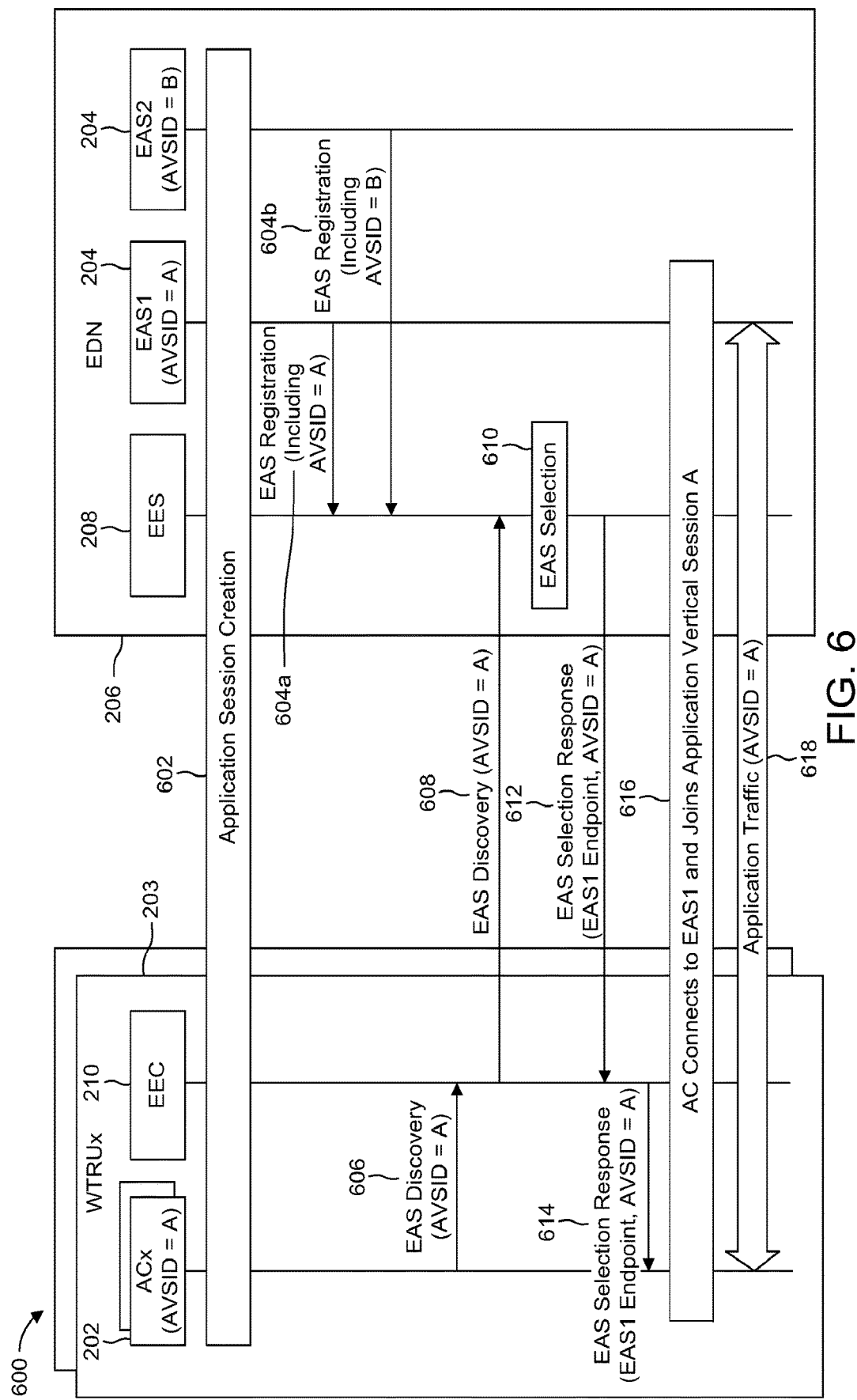
FIG. 6 illustrates an example of an application vertical-session-based EAS registration, discovery, and selection procedure.

FIG. 6 illustrates an example of an application-vertical-session-based EAS 204 registration, discovery, and selection procedure 600. As shown, the EEL may support the interconnection of ACs 202 on WTRUs 203 with the appropriate EAS 204 instances that are serving their application vertical sessions, via enhanced EAS registration, discovery, and selection procedures. As shown, there is an overall procedure flow with an operational example.

A benefit of these enhanced procedures is that they enable the AC 202 and/or EEC 210 to discover and select an EAS(s) 204 that not only provide(s) a certain type of service, but also enable(s) the AC and/or EEC to discover EAS(s) 204 that are associated with a particular instance of a service. Without this feature, the AC 202 and/or EEC 210 might be unable to discover and connect to the application vertical session that the AC wants to join (e.g., a gaming AC might be unable to connect to an application vertical session serving other ACs in the same game).

As shown in FIG. 6, there is an example procedure 600 of an AC 202 discovering an EAS 204 instance that is serving its application vertical session. Initially, at 602, there may be one or more prerequisites: at the application-level, an application vertical session may be created, and an Application Vertical Session ID (AVSID) may be assigned to identify the session. In the example, two application vertical sessions are created, one with AVSID="A" and another with AVSID "B". Note, "A" and "B" are examples merely for illustration of the related techniques and may vary in one or more other embodiments based on this disclosure. The AVSIDs may be distributed at the application-level across serving EASs 204 and consuming ACs 202. In other words, the AVSID may be received by an AC 202 in a message from an EAS 204, an application server, or the EEL (if the EEL has such capabilities). If an AVSID is not available and needs to be created, the methods for application-vertical-session management described herein may be utilized to create an AVSID for an application vertical session via the EEL.

At 604*a* and 604*b*, each EAS 204 may register with their EES 208 and provide their serving AVSIDs, for example via an application-vertical-session enhanced EAS profile as described herein (e.g., Table 5). The EES 208 may store the EAS-to-AVSID relationships in order to match EEC 208 requests for EAS 204 discovery to a serving EAS or groups of EASs. For example, FIG. 6 shows EAS1 registering with AVSID="A" and EAS2 registering with AVSID="B". EAS1 and EAS2 may share a common EASID or may have different EASIDs. The EAS 204 may have obtained an AVSID from another server such as a match-making server that can be hosted in the cloud or in an EDN 206. Alternatively, the AVSID may have been pre-configured in the EAS 204, for example via a configuration file or via configuration at EAS orchestration time; alternatively the AVSID may have been provided by the EEL assuming the EEL has such capabilities.

At 606, when an AC 202 needs to interface to an EAS(s) 204 serving its application vertical session, the AC may request EAS discovery from the EEC 201 and provide its associated Application Vertical Session ID(s). In the example, ACx 202 on WTRUx 203 requests EAS discovery for AVSID="A". Alternatively, the ACx 202 may implicitly trigger an EAS discovery at the EEC 210 by registering with the EEC and providing the AVSID in the registration. The ACx 202 may have obtained the AVSID from a pre-configured file, or from a user input, or from a match-making server hosted in the cloud or in an edge data network, or from the EEC 210 assuming the EEC has such capabilities.

At 608, the EEC 210 may process the EAS 204 discovery or AC 202 registration request from the AC and send an EAS 204 discovery request, including an enhanced AC profile(s) (e.g., such as described herein) within EAS discovery filter(s) to an EES 208 that is capable of serving the requested application vertical session. The EEC 210 may select the EES 208 that provides service for an application vertical session based on an enhanced AC 202 profile, such as the AC profile described herein.

At 610, upon receiving the EAS 204 discovery request, the EES 208 may perform a lookup of registered EASs matching EAS requirements including finding an EAS(s) that match(es) the requested AVSID(s) and selects only EAS(s) associated with the AVSID(s). In the example shown, the EES 208 selects EAS1 which is serving AVSID="A". Although the example is showing a single EAS 204 instance, the AC 202 could be served by a group of EASs that are serving the same AVSID="A".

At 612, the EES 208 responds to the EEC 210 with the selected EAS 204 endpoint(s) and the AVSID(s) that the EAS(s) is serving in an enhanced Service Session Context in the EEC Context, such as disclosed herein.

At 614, the EEC 210, in turn, may respond to the requesting AC 202 with the selected EAS 204 endpoint(s) and the AVSID(s) that the EAS(s) is (are) serving.

At 616, the Application Client (AC) 202 may connect to the selected EAS(s) 204 and join the application vertical session. In the illustrated example, ACx 202 on WTRUx 203 connects to EAS1 204 and joins into the application vertical session having AVSID="A".

For 606-616, these steps may be repeated for each AC 202 and WTRU 203 participating in the application vertical session.

At 618, if an EAS 204 is serving more than one application vertical session, the AVSID may be appended to application traffic requests to differentiate flows based on AVSID.

Figure 7:
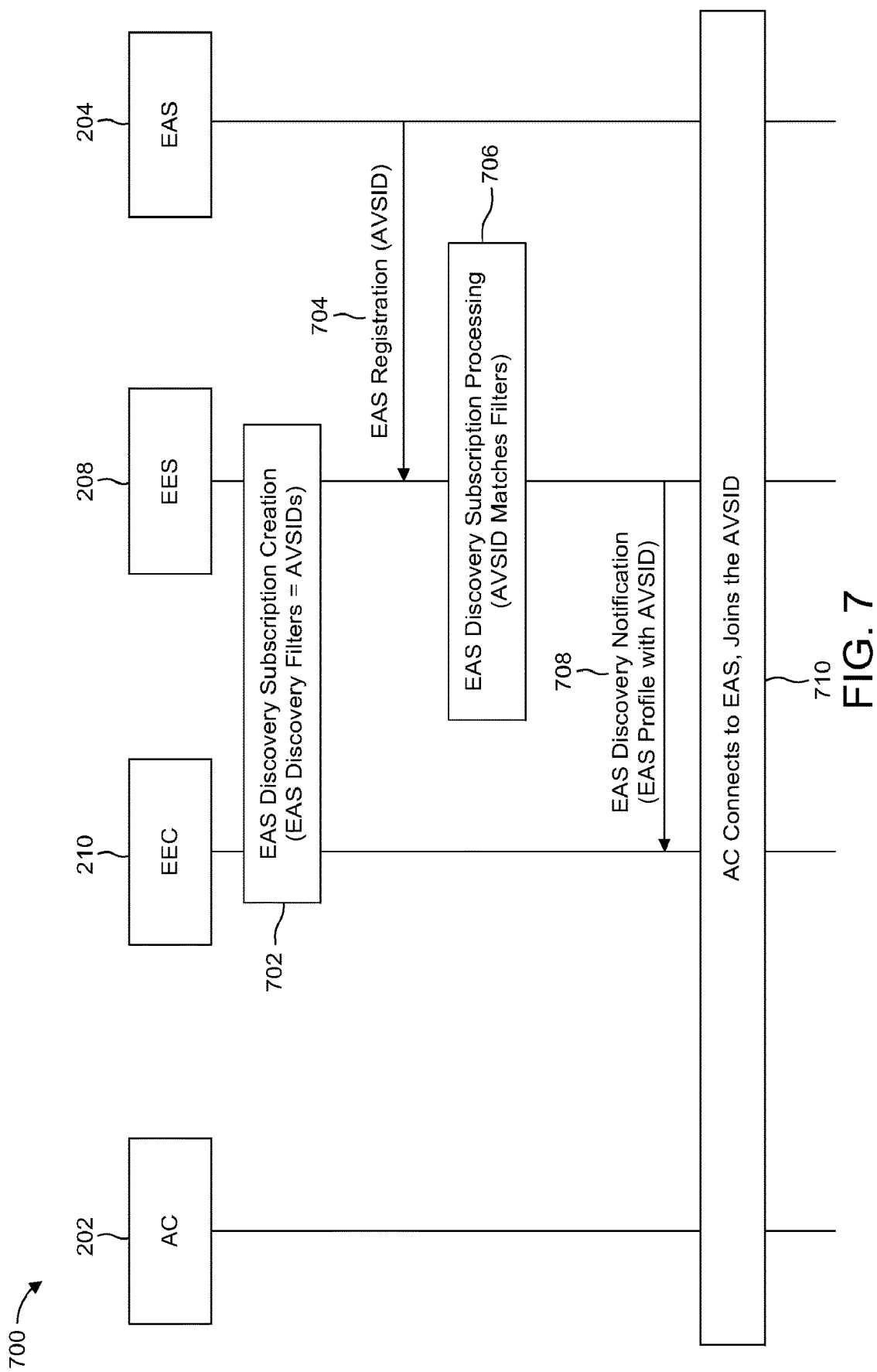
FIG. 7 illustrates an example of an application vertical-session-based EAS discovery notification.

FIG. 7 illustrates an example of an application-vertical-session-based EAS 204 discovery notification 700. The EAS 204 discovery subscription/notification procedures, as disclosed herein, may offer a method to inform an EEC 210 about the availability of an EAS in an EDN 206 asynchronously. As illustrated, there is an example of an application-vertical-session enhanced procedure for EAS Discovery subscriptions and notifications. This procedure may be useful when no EAS 204 instances were available to serve an AVSID(s) in an EAS Discovery request response, as described previously herein. The EES 208 may use the application-vertical-session enhanced EAS discovery notification to inform the EEC 210 of the dynamic availability of an EAS(s) 204 that may serve one or more application vertical sessions of interest.

Initially, there may be one or more prerequisite. An application vertical session(s) may be created, and an AVSID(s) may be assigned to identify the session. The AVSID may be provided to the EEC 210, for example, by the AC 202 when registering with the EEC or requesting EAS 204 discovery for an AVSID(s). The EEC 210 may attempt a synchronous EAS Discovery request procedure (e.g., FIG. 6) and no EASs 204 may be reported by the EES 208 as available to service the requested AVSIDs.

At 702, the EEC 210 may create an application-vertical-session EAS 204 discovery subscription with the EES 208 (e.g., as described herein), providing a set AVSIDs in EAS discovery filters or in EAS dynamic information filters (e.g., as disclosed herein).

At 704, at a later time, an EAS 204 may be instantiated in an EDN 206 to serve the application vertical session(s) that are identified by their respective AVSIDs. The EAS 204 may register with an EES 208 and provide its serving AVSIDs, for example via an enhanced EAS profile defined, e.g., as disclosed herein.

At 706, the EES 208 may use the EAS 204 registration information and evaluate the information against EAS discovery subscription filters, for example the AVSIDs from the subscription created at 702. The EES 208 may determine that a notification needs to be issued towards the EEC 210, since the AVSID(s) matches the subscription request.

At 708, the EES 208 may send the EAS Discovery notification to the subscribed EEC 210 and include the application-vertical-session(s) enhanced EAS profile (e.g., as disclosed herein).

At 710, the EEC 210 may inform the AC 202 about the EAS 204, providing the EAS endpoint(s) and the AVSID(s) that the EAS(s) is serving. The AC 202 may connect to the selected EAS(s) 204 and join the application vertical session.

Figure 8B:
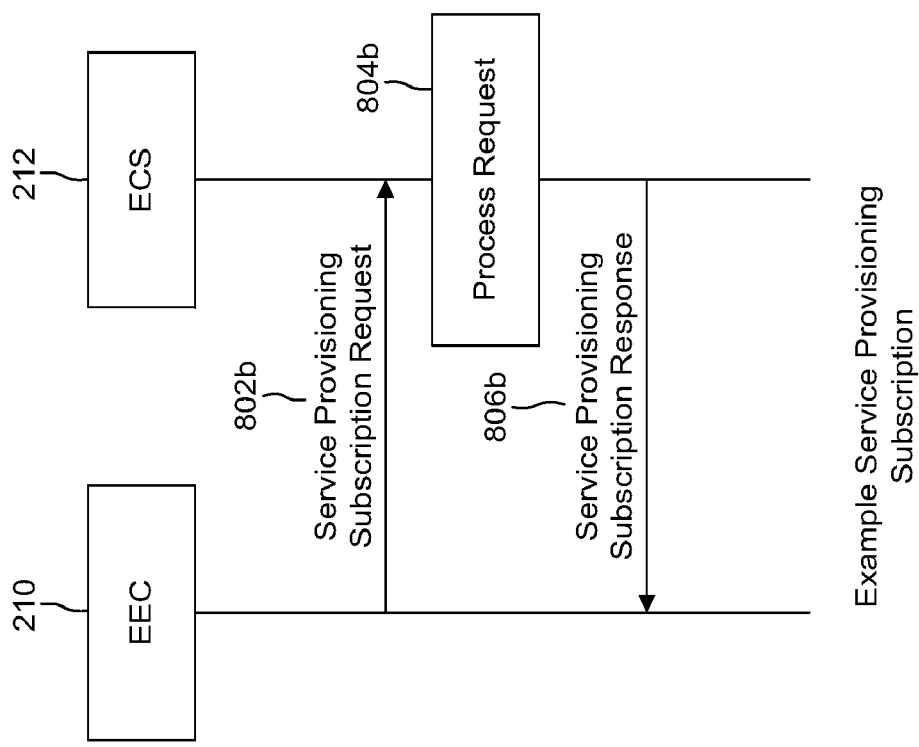
FIGS. 8a-8b illustrate an example of service provisioning.
Figure 8A:
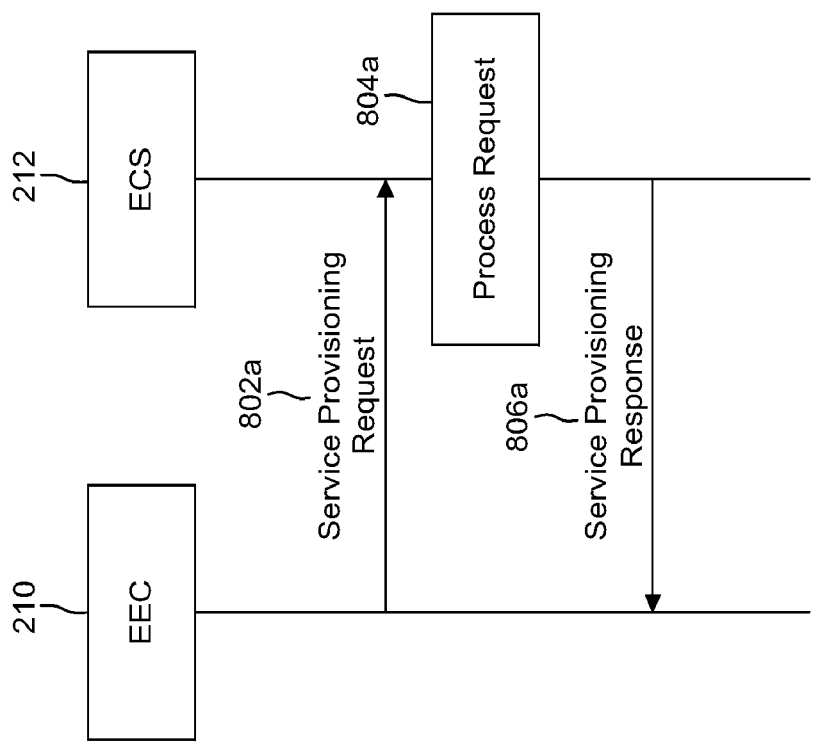

FIGS. 8*a* and 8*b* illustrate an example of service provisioning. Generally, in an EEL, the EEC 210 may utilize services of the ECS 212 to discover EDNs 206 and EESs 208 that can serve the needs of ACs 202 on a WTRU 203 via the service-provisioning procedure. In some cases, EDN 206/EES 208 service provisioning may consider EAS 204 and AC 202 type information (e.g., EASID and ACID) in the AC Profile. However, in some cases EDN 206/EES 208 service provisioning may not consider any application-vertical-session information. This may cause an EEC 210/AC 202 to discover EESs 208 in different EDNs 206 that may be available to the WTRU 203 without knowing which EAS 204/EDN 206 can provide the needed application vertical session; consequently, there is an issue where the EEC 210 has to iterate performing EAS 204 discovery with each EES 212 until the EEC finds an EAS that supports its desired AVSID(s). To address this, it may be beneficial to discover and signal the availability of EDNs 206 and their EESs 208 in relation to requested AVSIDs that are served or can be served by EASs 204 within such EDNs.

A benefit of this enhanced procedure is that it allows the AC 202 and EEC 210 to discover EDN(s) 206 and EES(s) 208 that can be used to reach EAS(s) 204 that not only provides a certain type of service, but also it allows the AC and EEC to discover EDN(s) and EES(s) that can be used to reach EAS(s) that are associated with a particular instance of a service (e.g., serving an application vertical session). Without this feature, the AC 202 and EEC 210 may not be able to discover and connect to the application vertical session that the AC 202 wants to join (e.g., the gaming AC would not connect to EAS(s) 204 serving a game match identified by a particular one or more AVSIDs).

At 802*a* and 802*b*, the EEC 210 issues, to the ECS 212, a service provisioning request or a service provisioning subscription request.

Figure 9:
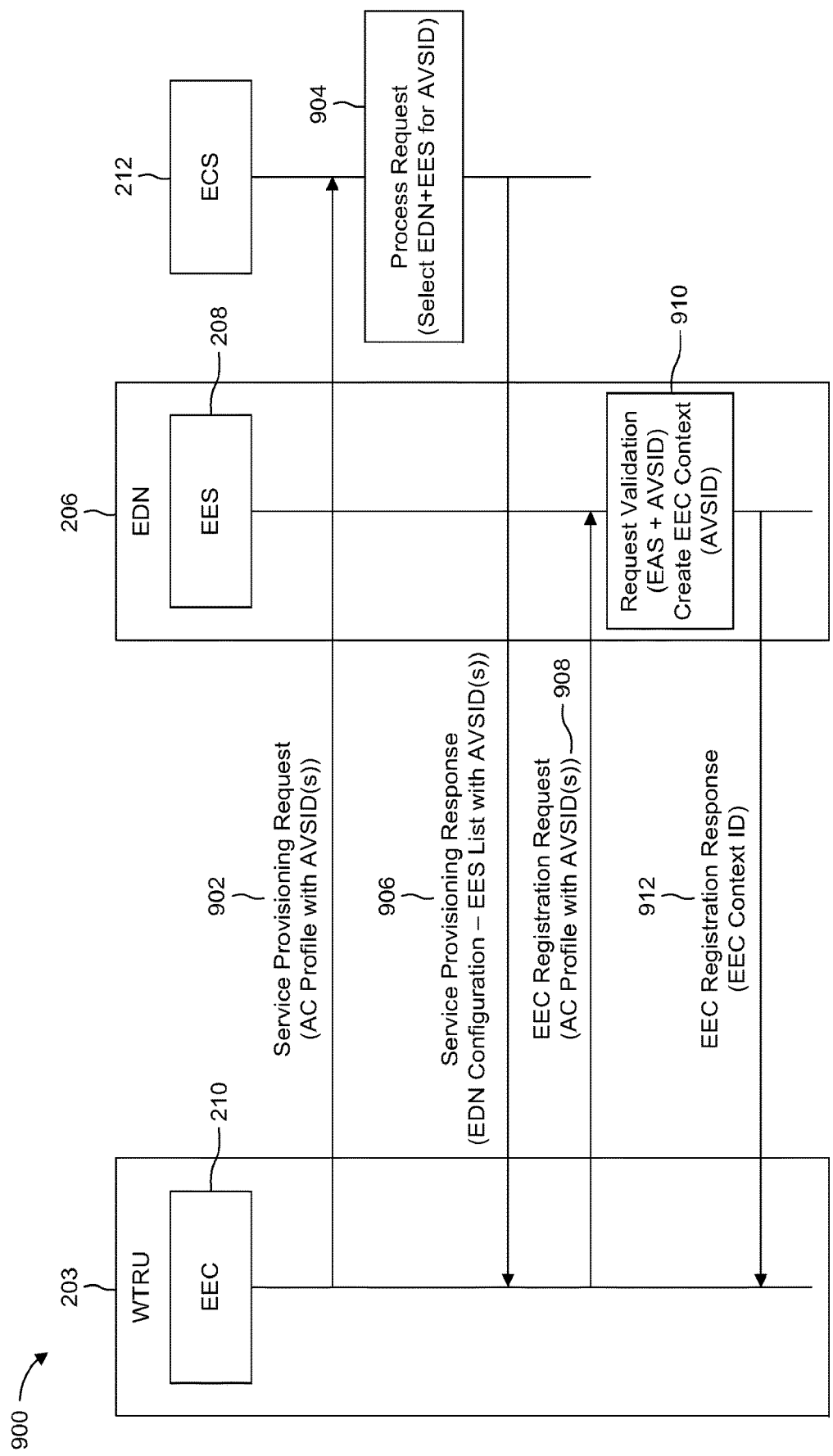
FIG. 9 illustrates an example of application vertical-session-based EES provisioning and selection.

FIG. 9 illustrates an example of an application-vertical-session-based EES 208 provisioning-and-selection procedure 900. This example describes EDN 206/EES 208 service provisioning in the EEC 210 request-response model. In this model, the EEC 210 requests EES 208 service provisioning providing its requested AVSIDs. The ECS 212 may provision the EEC 210 with an EES 208/EDN 206 that can service its requested AVSIDs.

Initially (not shown), there may be one or more prerequisites. An application vertical session(s) may be created, and an Application Vertical Session ID(s) may be assigned to identify the session. The AVSID may be provided to the EEC 210, for example, by the AC 202 when registering with the EEC 210 or requesting EAS 204 discovery for an AVSID(s).

At 902, the EEC 210 may send a service provisioning request to the ECS 212. The service provision request may include a set of AC 202 Profiles with AVSIDs for the AC-requested application vertical sessions (e.g., as disclosed herein).

At 904, upon receiving the service provisioning request, ECS 212 may perform an authorization check. Using the EEC 210 provided enhanced AC Profile(s), which include AVSID(s) (e.g., as disclosed herein), the ECS 212 may identify and select an EES(s) 208 and associated EDN(s) 206 that can service the application-vertical-session's (s') requests from the ACs 202. The EES 208 may provide the ECS 212 with the EAS(s) 204 and AVSID(s) that are served in their EDN 206 using an enhanced EES profile (e.g., as disclosed herein) from their EES registration (not shown).

At 906, the ECS 212 may return a service-provisioning response with an enhanced EDN 206 configuration(s) that includes a list of EESs 208 with the EAS(s) 204 and AVSID(s) that each EES can serve (e.g., as disclosed herein).

At 908, the EEC 210 in the WTRU 203 may use the enhanced EDN 206 configuration to select the EES(s) 208/EDN(s) 206 that can service the WTRU's AC(s) 202 including their application vertical sessions and to perform an EEC 210 registration request to the selected EES(s), including an AC 202 profile(s) with AVSIDs (e.g., as disclosed herein).

At 910, the EES 208 may validate the EEC 210 registration request. Using the AC profile(s) with AVSIDs, the EES 208 may determine if the requests for service can be fulfilled.

At 912, the EES 208 may return an EEC registration response to the EEC 210, including an EEC context ID. The EEC context ID may refer to an enhanced EEC context instance in the EES 208 (e.g., as disclosed herein).

Figure 10:
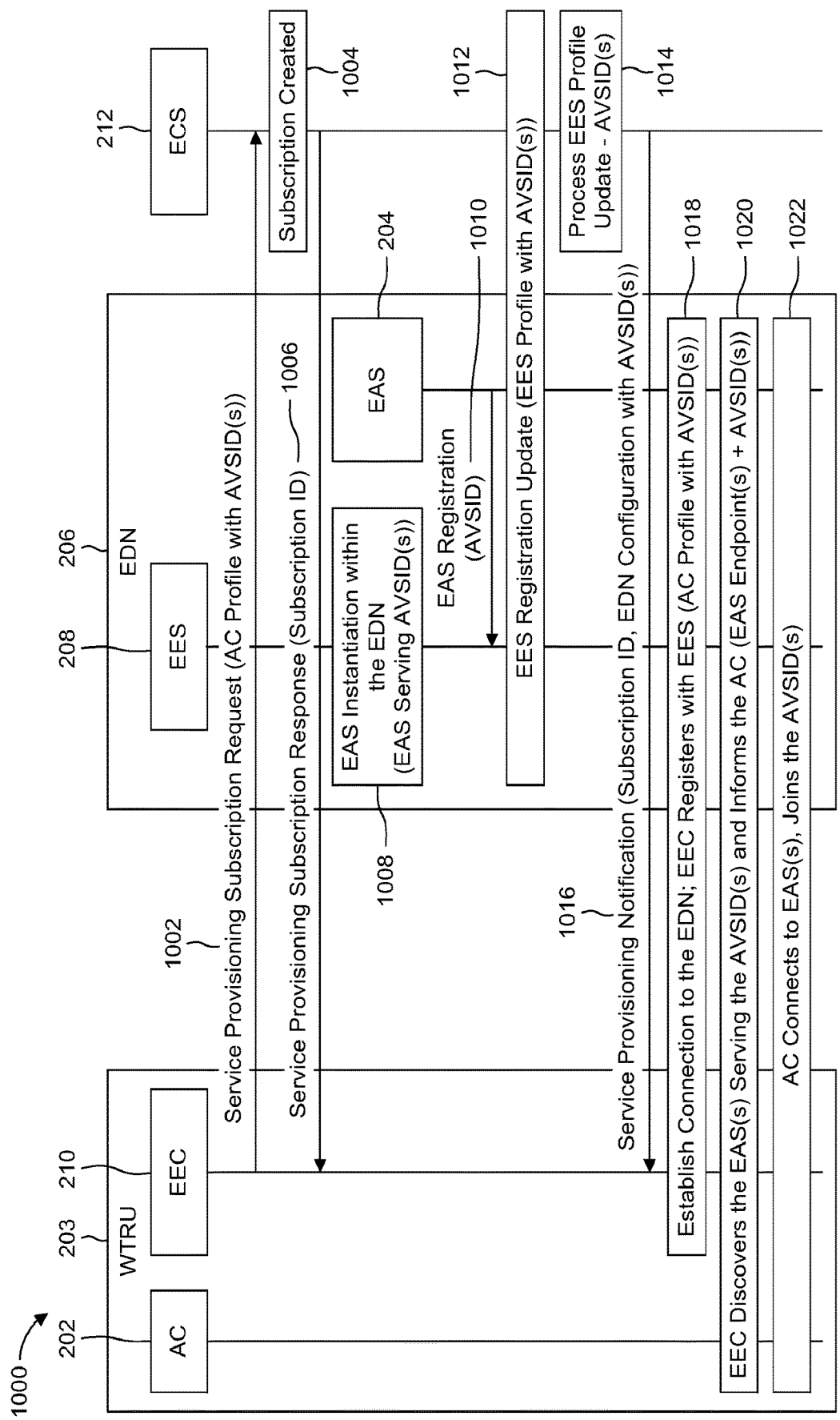
FIG. 10 illustrates an example of application vertical-session-based EES provisioning notification.

FIG. 10 illustrates an example of an application-vertical-session-based-EES-208-provisioningnotification procedure 1000. This example may address the EDN/EES service provisioning in the EEC 210 subscription-notification model. This model may be used to asynchronously inform an EEC 210 of the availability of an EES 208 and an EDN 206. In this enhanced procedure, the ECS 212 may inform the EEC 210 via a notification when an EAS 204 (e.g., servicing a requested AVSID(s)) becomes available in an EDN 206 and is discoverable via an EES 208.

Initially, not shown, there may be one or more prerequisites. An application vertical session(s) may be created, and an Application Vertical Session ID(s) may be assigned to identify the session. The AVSID(s) may be provided to the EEC 210, for example, by the AC 202 when registering with the EEC or requesting EAS 204 discovery for an AVSID(s). The EEC 210 may have attempted the enhanced-service-provisioning request-response model (e.g., as described herein) and found there are no EDNs 206 and EESs 208 available for the requested AVSID(s).

At 1002, the EEC 210 may send a service-provisioning-subscription request to the ECS 212. The service-provisioning subscription may include a set of AC Profiles that provide AVSIDs for the AC 202 requested application vertical sessions (e.g., as disclosed herein).

At 1004 and 1006, the ECS 212 may create a subscription for the EEC 210 and store the requested AC Profiles with their AVSIDs.

At 1008, (e.g., at a later time) an EAS 204 may be instantiated in an EDN 206 to serve the application vertical session(s) that are identified by their respective AVSIDs.

At 1010, in order to inform the EEL of its information, the EAS 204 may register with the EES 208 and provide its serving AVSIDs, for example via the enhanced EAS profile (e.g., as disclosed herein). The EES 208 may store the EAS-to-AVSID relationships in order to match EEC 210 requests for EAS 204 discovery to a serving EAS.

At 1012, the EES 208 may register or update its registration with the ECS 212, providing an enhanced EES profile (e.g., as disclosed herein) that includes EASs 204 available to the EES 208 referenced by their EASIDs and the AVSID(s) that an EAS 204 may be serving.

At 2014, the ECS 212 may process the new or updated EES 208 registration information, including EASIDs with associated AVSIDs. The ECS 212 may determine if any service provisioning notifications need to be issued to an EEC 210 to signal AVSID availability in an EDN 206/EES 208, based on the information received from an EEC(s) in 1002.

At 1016, the ECS 212 may issue a service provisioning notification to any EECs 210 that need to be informed about AVSID(s) availability from 1014. The service-provisioning notification may send an enhanced EDN 206 configuration(s) that includes a list of EESs 208 with the EAS(s) 204 and AVSID(s) that each EES can serve (e.g., as disclosed herein).

At 1018, in order to provide an AC 202 access to an ASVID-serving EAS 204, the EEC 210/WTRU 203 may connect to the EDN 206 using the enhanced EDN configuration received in 1016. This may include the establishment of a new PDU session to the EDN 206, if an existing PDU session is not available, or an update to an existing PDU session. The EEC 210 may register with the indicated EES(s) 208 from 1016, including an AC 202 profile(s) with AVSIDs (e.g., as disclosed herein).

At 1020, after the EEC 210 registers with an EES 208, the EEC may discover the EAS(s) 204 serving the needed AVSID(s) and provide their information to the requesting AC(s) 202 (e.g., as disclosed herein).

At 1022, with the EEC 210 provided EAS 204 information (e.g., the enhanced EAS profile as described herein), the AC(s) 202 may connect to the selected EAS(s) 204 and joins/join the application vertical session.

For one or more embodiments disclosed herein, there may be an enhanced data model for edge-enabler-layer application vertical session(s). An AC Profile may contain information about an AC 202. The AC Profile may be utilized by the EEC 210, EES 208, and ECS 212 to provision a WTRU 203 for EEL service. The ECS 212 may select with which EES 208 to provision a WTRU 203, using the AC profile. The EES 208 may use the AC Profile to select EAS 204 instances for EAS discovery. The EEC 210 may provide EAS endpoint information to an AC 202 on selected/available EAS 204 instances. The EAS Profile may be enhanced to include AVSIDs. Table 5 illustrates an example of an application-vertical-session enhanced AC profile.

TABLE 5

Example of an application-vertical-session enhanced AC profile

| Information element | Status | Description |
|---|---|---|
| ACID | M | Identity of the AC. |
| AC Type | O | The category or type of AC (e.g., V2X). This is an implementation specific value. |
| Application Vertical Session Identifiers (AVSID) | O | Identifies the Application Vertical Sessions for the AC. |
| Preferred ECSP list | O | When used in a service provisioning request, this item indicates to the ECS 212 which ECSPs are preferred for the AC 202. The ECS 212 may use this information in the selection of EESs 208. |
| AC Schedule | O | The expected operation schedule of the AC 202 (e.g., time windows) |
| Expected AC Geographical Service Area | O | The expected location(s) (e.g., route) of the hosting WTRU 203 during the AC's operation schedule. This geographic information can express a geographic point, polygon, route, signaling map, or waypoint set. |
| AC Service Continuity Support | O | Indicates if service continuity support is required or not for the application. This item also indicates which ACR scenarios are supported by the AC 202 and which of these are preferred by the AC. |
| List of EASs | O | List of EASs 204 that serve the AC 202 along with the service KPIs required by the AC |
| >EASID | M | Identifier of the EAS 204 |
| >Expected AC Service KPIs | O | KPIs expected in order for ACs 202 to receive currently required services from the EAS 204, as described in Table 8.2.3-1 |
| >Minimum required AC Service KPIs | O | Minimum KPIs required in order for ACs to receive meaningful services from the EAS, as described in Table 8 |

An EAS 204 profile may include information that the EES 208 utilizes to discover and select EAS instances upon request from the EEC 210. The EES 208 may store an EAS Profile for each registered EAS 204. The EAS Profile may be enhanced to include AVSID for identifying sessions that the EAS 204 serves. Table 6 illustrates an example of an application-vertical-session enhanced EAS profile.

TABLE 6

Example of an application-vertical-session enhanced EAS profile

| Information element | Status | Description |
| --- | --- | --- |
| EASID | M | The identifier of the EAS 204 |
| EAS Endpoint | M | Endpoint information (e.g., URI, FQDN, IP address) used to communicate with the EAS 204. This information maybe discovered by the EEC 210 and exposed to ACs 202 so that the ACs can establish contact with the EAS 204. |
| ACID(s) | O | Identifies the AC(s) 202 that can be served by the EAS 204 |
| Application Vertical Session Identifiers (AVSID) | O | Identifies the Application Vertical Sessions that are served by the EAS 204. |
| EAS Provider Identifier | O | The identifier of the ASP that provides the EAS 204. |
| EAS Type | O | The category or type of EAS 204 (e.g., V2X) |
| EAS description | O | Human-readable description of the EAS 204 |
| EAS Schedule | O | The availability schedule of the EAS (e.g., time windows) |
| EAS Geographical Service Area | O | The geographical service area that the EAS 204 serves. ACs 202 in WTRUs 203 that are located outside this area shall not be served. |
| EAS Topological Service Area | O | The EAS 204 serves WTRUs 203 that are connected to the Core Network from one of the cells included in this service area. ACs 202 in WTRUs 203 that are located outside this area shall not be served. See possible formats in Table 8. |
| EAS Service KPIs | O | Service characteristics provided by EAS 204, detailed in Table 8 |
| EAS service permission level | O | Level of service permissions, e.g., trial, gold-class, supported by the EAS 204 |
| EAS Feature(s) | O | Service features, e.g., single vs. multi-player gaming service supported by the EAS 204 |
| EAS Service continuity support | O | Indicates if the EAS 204 supports service continuity or not. This item also indicates which ACR scenarios are supported by the EAS 204. |
| List of EAS DNAI(s) | O | DNAI(s) associated with the EAS 204. For example, this item is used as Potential Locations of Applications in clause 5.6.7 of 3GPP TS 23.501 [2]. It is a subset of the DNAI(s) associated with the EDN 206 where the EAS 204 resides. |
| List of N6 Traffic Routing requirements | O | The N6 traffic routing information and/or routing profile ID corresponding to each EAS 204 DNAI. |
| EAS Availability Reporting Period | O | The availability reporting period (i.e., heartbeat period) that indicates to the EES 208 how often it needs to check the EAS's availability after a successful registration. |
| EAS Status | O | The status of the EAS 204 (e.g., enabled, disabled, etc.) |

An EES profile may include information about an EES 208 and the services that it provides. The EES profile may be enhanced to include AVSID for application vertical sessions that the EES 208 may support. Table 7 illustrates an example of an application-vertical-session enhanced EES profile.

TABLE 7

Example of an application-vertical-session enhanced EES profile

| Information element | Status | Description |
| --- | --- | --- |
| EESID | M | The identifier of the EES 208 |
| EES Endpoint | M | Endpoint information (e.g., URI, FQDN, IP address) used to communicate with the EES 208. This information is provided to the EEC 210 to connect to the EES 208. |
| EASIDs | M | List of EASIDs registered with the EES 208. |
| Application Vertical Session Identifiers (AVSID) | O | Identifies the Application Vertical Sessions that are available via the EES 208. |
| EEC registration configuration | M | Indicates whether or not the EEC 210 is required to register on the EES 208 to use edge services. |
| EES Provider Identifier | O | The identifier of the ECSP that provides the EES Provider. |

TABLE 7-continued

Example of an application-vertical-session enhanced EES profile

| Information element | Status | Description |
| --- | --- | --- |
| EES Topological Service Area | O | The EES 208 serves WTRUs 203 that are connected to the Core Network from one of the cells included in this service area. EECs in WTRUs that are located outside this area shall not be served. See possible formats in Table 8. |
| EES Geographical Service Area | O | The area being served by the EES 208 in Geographical values |
| List of EES DNAI(s) | O | DNAI(s) associated with the EES 208. For example, this item is used as Potential Locations of Applications in clause 5.6.7 of 3GPP TS 23.501 [2].<br>It is a subset of the DNAI(s) associated with the EDN 206 where the EES 208 resides. |
| EES Service continuity support | O | Indicates whether or not the EES 208 supports service continuity. This item also indicates which ACR scenarios are supported by the EES 208. |

An Service Session Context may be enhanced to include the Application Vertical Session Identifier(s) for a service session context. Table 8 illustrates an example of an application-vertical-session enhanced EEC context.

TABLE 8

Example of an application-vertical-session enhanced EEC context

| Information element | Status | Description |
| --- | --- | --- |
| EAS ID | M | Identifier of the EAS 204 providing the application services |
| EAS Endpoint | M | Endpoint information of the EAS 204. |
| AC ID | O | Identifier of the AC 202 ID for which the service session is provided, if determined. |
| Application Vertical Session Identifiers (AVSID) | O | Identifies the Application Vertical Sessions within the service session, if determined. |

EDN Configuration Information type may be enhanced to include the AVSID(s) within the "List of EESs". This information may be used to signal to an EEC 210 what application vertical sessions are served by an EEC (via EASs 204) within an EDN 206 and discoverable via the EES 208. The EDN Configuration may be utilized in ECS 212 service provisioning for the request-response model and the subscribe-notify model. Table 9 illustrates an example of an application-vertical-session enhanced EDN configuration information.

TABLE 9

Example of an application-vertical-session enhanced EDN configuration information

| Information element | Status | Description |
| --- | --- | --- |
| EDN connection information (NOTE 1) | M | Information required by the WTRU 203 to establish connection with the EDN 206. |
| >DNN/APN | M | Data Network Name/Access Point Name |
| >S-NSSAI | O | Network Slice information |
| >EDN Topological Service Area | O | The EDN 206 serves WTRUs 203 that are connected to the Core Network from one of the cells included in this service area. See possible formats in Table 8. |
| List of EESs | M | List of EESs 208 of the EDN 206. |
| >EESID | M | The identifier of the EES 208 |
| >EES Endpoint | M | The endpoint address (e.g., URI, IP address) of the EES 208 |
| >EASIDs (NOTE 2) | O | List of EASIDs registered with the EES 208. |
| >Application Vertical Session Identifiers (AVSID) (NOTE 2) | O | List of Vertical AVSIDs served from the EES 208 |
| >EES Provider identifier | O | The identifier of the EES 208 Provider (such as ECSP) |
| >EES Topological Service Area | O | The EES 208 serves WTRUs 203 that are connected to the Core Network from one of the cells included in this service area. EECs 210 in |

TABLE 9-continued

Example of an application-vertical-session enhanced EDN configuration information

| Information element | Status | Description |
|---|---|---|
| | | WTRUs 203 that are located outside this area shall not be served. See possible formats in Table 8. |
| >EES Geographical Service Area | O | The area being served by the EES 208 in Geographical values |
| >List of EES DNAI(s) | O | DNAI(s) associated with the EES 208/EAS 204. For example, this item is used as Potential Locations of Applications in clause 5.6.7 of 3GPP TS 23.501 [2]. |
| >EES Service continuity support | O | Indicates if the EES 208 supports service continuity or not. This item also indicates which ACR scenarios are supported by the EES 208. |
| >EEC registration configuration | M | Indicates whether or not the EEC 210 is required to register on the EES 208 to use edge services. |
| Lifetime | O | Time duration for which the EDN 206 configuration information is valid and supposed to be cached in the EEC 210. |

NOTE 1:
If the WTRU 203 is provisioned or pre-configured with URSP rules by the HPLMN, the WTRU may handle the precedence between EDN 206 connection info and URSP rules as defined in 3GPP TS 23.503 [12] clause 6.1.2.2.1. EDN 206 connection info is considered to be part of WTRU 203 Local Configurations.
NOTE 2:
EAS 204 information is limited to the EEC 210 requested applications. If no AC 202 profiles were present in the service provisioning request, the EAS 204 information is subject to the ECSP policy (e.g., no EAS information or a subset of EAS information related to the EES 208).

EAS 204 dynamic information filters may be enhanced to notify an EEC 210 of dynamic changes to application vertical sessions, indicated by AVSID, served by an EAS 204 via EAS Discovery subscriptions. Table 10 illustrates an example of an application-vertical-session enhanced-EAS dynamic-information filter.

TABLE 10

Example of an application-vertical-session enhanced EAS dynamic-information filter

| Information element | Status | Description |
|---|---|---|
| List of dynamic information filters | M | List of EAS 204 dynamic information required by the EEC 210 per EAS. |
| >EASID | M | Identifier of the EAS 204 |
| >ACIDs | O | Flag to notify change in list of ACIDs served by the EAS 204 |
| >AVSIDs | O | Flag to notify change in the list of Application Vertical Session IDs served by the EAS 204. |
| >EAS Description | O | Flag to notify change in description of the EAS 204. |
| >EAS Endpoint | O | Flag to notify change in EAS 204 endpoint |
| >EAS Features | O | Flag to notify any change in features provided by the EAS 204 |
| >EAS Schedule | O | Flag to notify change in availability schedule of the EAS 204 (e.g., time windows) |
| >EAS Service Area | O | Flag to notify change in change in geographical service area that the EAS 204 serves |
| >EAS Service KPIs | O | Flag to notify change in characteristics of the EAS 204. |
| >EAS Status | O | Flag to notify change in the status of the EAS 204 (e.g., enabled, disabled, etc.) |
| >Service continuity support | O | Flag to notify change in EAS 204 support for service continuity. |

An Application Vertical Session Identifier (AVSID) may be formatted such that it is a union of multiple identifiers or pieces of information. For example, the AVSID may include: a service provider identifier; a unique number that is associated with a vertical session or piece of context information; an authorization service identifier that can be used as a trusted third party to verify that the AC 202/EEC 210 is authorized to provide the AVSID (e.g., as described earlier, the AVSID, and therefore the authorization service identifier, may be provided to the AC via application-layer interaction with the service provider, where the authorization service identifier may be pre-assigned, or pre-negotiated with the mobile-network operator); one or more PLMN Identifiers that identify PLMNs that may be used to access the service; and/or, one or more ECS 210 identifiers that may be used to be provisioned with information about EDN(s) 206 and EES(s) 208 that can be used to discover EDN(s) and EES(s) that can be used to reach EAS(s) 204 that are associated with the session.

In one or more embodiments disclosed herein, there may be security problems and solutions, such as security associated with AVSID(s). In some cases, a token may be used for EEC 210 authorization to access EES 208. Since multiple EASs 204 can register with the same EES 208, when an authorization token(s) is issued from the ECS 212 to the EEC 210 for the EES 208 access authorization, the token may contain the AVSID to bind the authorization with the EES/AVSID pair. Otherwise, the AC 202/EEC 210 can access EES 208 info associated with EAS 204 with different AVSID. In some cases, there may be session key binding with the AVSID. If a security association is established to protect the communication between the AC 202/EAS 204 after the AC is authorized to access the EAS, the session key for security protection of the communication channel between AC/EEC with EAS may be bound to the EAS using the AVSID (e.g., the AVSID should be included as the input parameters when derived from the session key).

In one or more embodiments disclosed herein, there may be management techniques for application vertical sessions (AVS). Application-vertical-session management may require the EEL to provide support for creating and deleting AVS. AVS creation may be required when an AC 202 or EEC 210 initiates an AVS or may alternatively be useful for pre-provisioning AVS ahead of usage. As some of the embodiments discussed herein, the AVS and AVSID may be known at the EAS 204 or AC 202. In addition or in the alternative, there may also be techniques for provisioning the AVSID using the edge-enablement layer.

Figure 11:
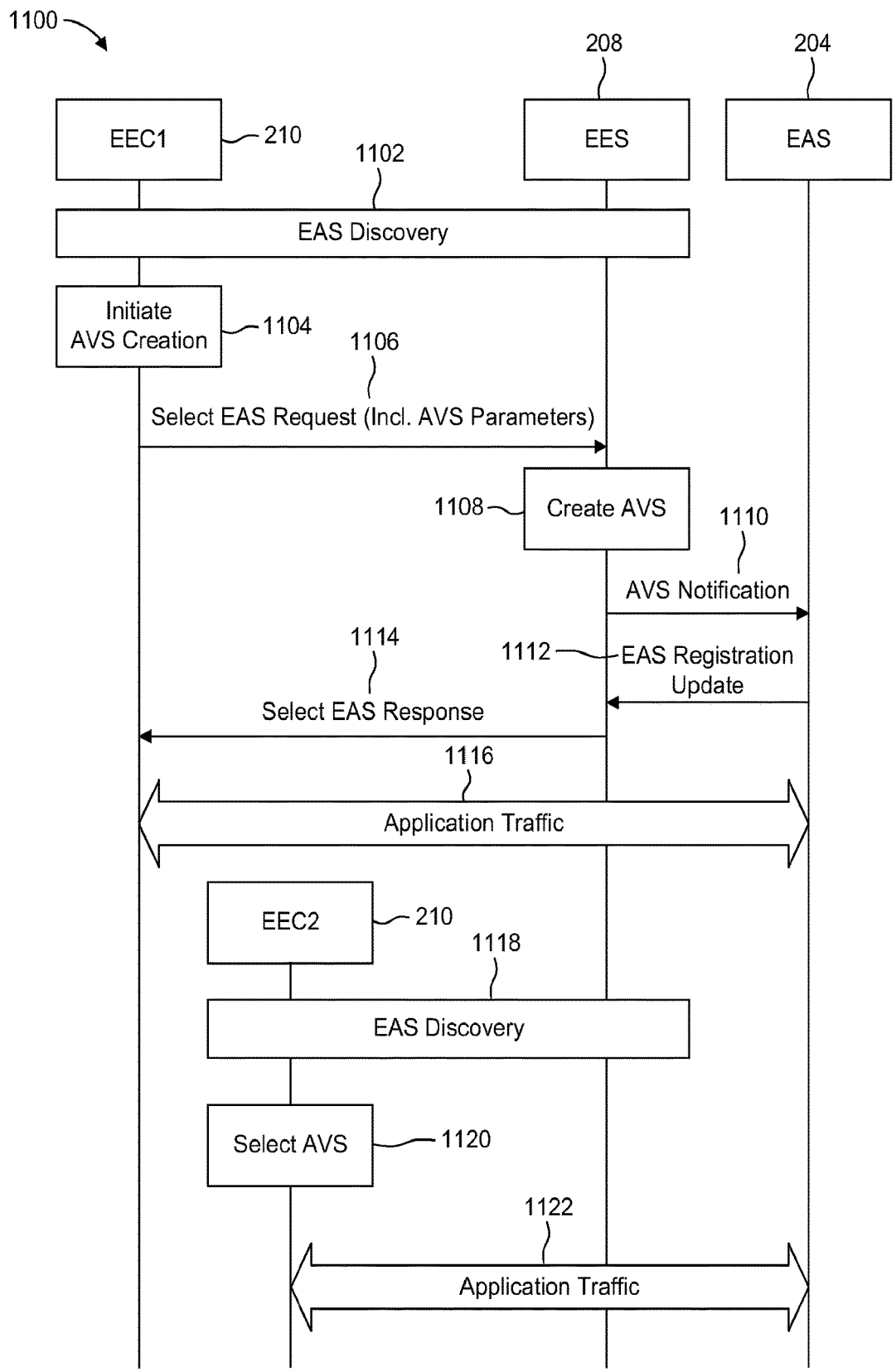
FIG. 11 illustrates an example of AVS creation using the edge enabled layer.

FIG. 11 illustrates an example procedure 1100 of AVS creation using the edge-enabled layer. In this example procedure, there is a method for creating an application vertical session provided by the edge-enablement layer.

Initially, at 1102, the EEC 210 may be present on a first WTRU 203 (e.g., EEC1) and may perform the EAS 204 discovery procedure as described herein; as a result, the EEC may obtain a list of EASs that meet the EEC criteria specified in the EAS discovery request. The EAS 204 discovery request may contain an AVSID that EEC1 210 may try to discover, in which case it may not receive any EAS in the list (e.g., if the AVSID does not exist). In this use case, the EEC1 210 did not provide an AVSID and received a list of existing EAS(s) 204.

At 1104, the EEC1 210 may initiate AVS creation, which in EEC1 means acquiring the parameters needed to create an AVS in the EEL. For example, this action may be triggered from a request originating from an AC 202 using EEC1 210; or, for example, this action may be triggered by a user, or for example this action may be from a pre-defined AVS configuration present at WTRU1 203; or, for example, this action may be triggered by receiving a message such as a SMS, or, for example, this action may be triggered by other external sources such as another WTRU 203 or server. In any case, the information required to create an AVS may be provided by the source that triggered the AVS initiation. The AVS parameters may include an AVS identifier (AVSID) that uniquely identifies the AVS resource, may include a friendly AVS name that may allow a user to recognize the AVS, may include a list of users or terminals that are allowed to join the AVS, may include a maximum number of users allowed to join an AVS, may include a location (e.g., geographical or topological) where the AVS can be used, and/or, may include a duration for which the AVS will exist.

At 1106, the EEC1 210 may send an EAS 204 selection request to the EES 208 to indicate its intention of using the EAS; the EEC1 may include the AVS parameters in this request to indicate to the EES that it needs to create an AVS.

At 1108, upon receiving the EAS 204 selection request with the AVS parameters, the EES 208 may store the AVS parameters, for example in the EEC context, and may allocate an AVSID if no AVSID was included in the EAS selection request. This AVSID may be used to uniquely identify the AVS. Alternatively in some systems, the EAS 204 selection request may trigger the instantiation of an EAS if no suitable EAS is available. In this case, the AVS parameters which may include an AVSID provisioned with the orchestration of the EAS 204 and the AVS notification message in 1110 is not needed.

At 1110, the EES 208 may notify the selected EAS 204 of the newly created AVS. Not shown in FIG. 11, the EAS 204 may have subscribed to the EES 208 to receive AVS management events in a similar manner as described herein for subscribing to ACR management events. The AVS notification may include the AVS parameters. If the EAS 204 can support the newly received AVS, then the EAS may store the AVS parameters and AVSID, and return a success indication to the EES 208. If the notification did not include an AVSID, then the EAS 204 may create an AVSID to uniquely identify the AVS. If the EAS 204 cannot support the newly received AVS, it may not store the parameters and returns an error indicating the failure to the EES 208.

At 1112, if the EAS 204 can support the newly received AVS, then the EAS may perform a registration update of its EAS profile at the EES 208 with the newly received AVSID.

Alternatively, if the EAS 204 was instantiated in 1108, it may perform this by performing an EAS registration with the EES 208.

At 1114, the EES 208 may send an EAS 204 selection response to the EEC1 210. The response may include the following information elements: the result of the EAS 204 selection, and/or the AVSID. If the AVS was not successfully created, the EAS 204 selection response may contain an error message indicating the reason of failure. Upon receiving the AVSID, the EEC1 210 may store the AVSID and inform the AC 202.

At 1116, the AC 202 present on the first WTRU 203 connects and starts exchanging application traffic with the EAS 204 associated with the AVSID.

At 1118, an EEC 210 may be present on a second WTRU 203 (e.g., on which EEC2 210 is instantiated) and may perform the EAS discovery procedure as described herein; as a result, the EEC may obtain a list of EAS(s) 204 that meet the EEC criteria specified in the EAS discovery request.

The EEC2 210 may have received an AVSID from the first WTRU 203: for example, it may have received the AVSID from a request originating from an AC 202 using EEC2 (e.g., AVSID exchanged between ACs); or, for example, it may have received the AVSID from a user; or, for example, it may have received the AVSID from a message such as a SMS; or, for example, it may have received the AVSID from external sources such as another WTRU 203 or server. In such a case, the EEC2 210 may include the AVSID in the EAS discovery request, and the EES 208 may use the AVSID to identify the EAS 204 hosting the AVS and return the address of the EAS hosting the AVS to the EEC2.

Alternatively, the EEC2 210 may not have the AVSID, where the EEC2 sets a flag in the EAS discovery request indicating that it wants to discover an AVS available at the EES 208. The EES 208 may provide in the EAS discovery response a list of all the AVSIDs available and may include some AVS parameters such as the AVS friendly name; the EES may filter the available AVS returned to EEC2 210 by using the WTRU identity, the user identity, the AC identity, or the WTRU location.

At 1120, upon receiving a list of EAS 204 from EAS discovery, the EEC 210 may select one EAS. The EEC 210 may select the EAS 204 based on the AVSID that it may have received in 1118. If the EEC 210 does not know which AVSID to select, it may present a list of available AVSID to a user of the WTRU 203 for a manual selection.

At 1122, the AC 202 present on the second WTRU 203 connects and starts exchanging application traffic with the EAS 204 serving the AVSID.

Figure 12:
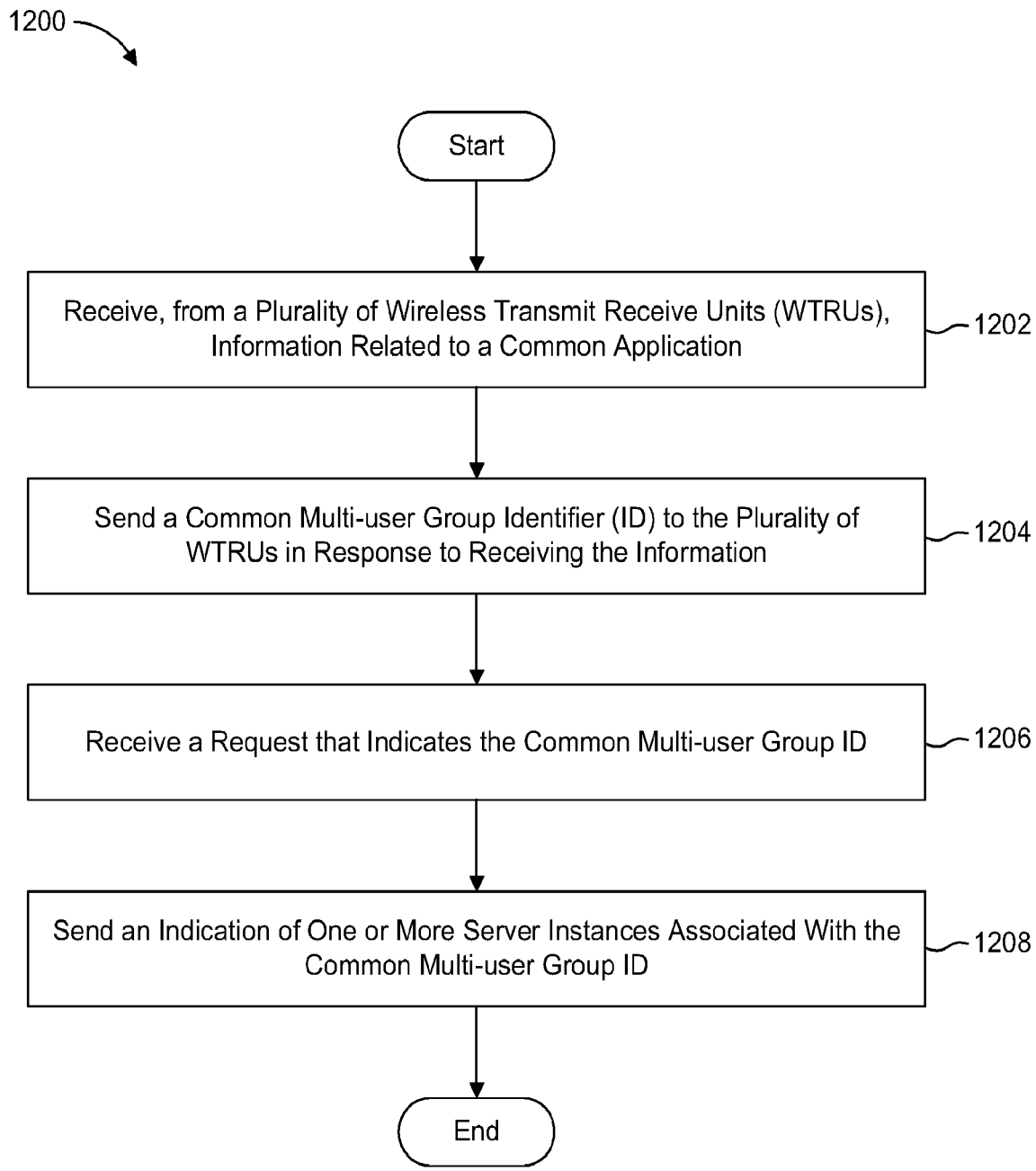
FIG. 12 is a flow diagram of an example of a method for setting up server instances and a multi-user group identifier (ID) for a common application.

FIG. 12 is a flow diagram of an example of a method for setting up server instances and a multi-user group identifier (ID) for a common application, such as a common application client 202.

At 1202, a server, such as an edge-enabler server (EES) 208 or an edge-configuration server (ECS) 212, receives, from a plurality of WTRUs 203, information related to a common application such as a common application client 202.

At 1204, the server sends a common multi-user group identifier (ID) to the plurality of WTRUs 203 in response to receiving the information.

At 1206, the server receives (for example, from an edge-enabler client (EEC) 210, or other component, of one or more of the plurality of WTRUs 203) a request that indicates the common multi-user group ID.

And at 1208, the server sends (for example, to an EEC 210, or other component, of one or more of the plurality of WTRUs 203) an indication of one or more server instances (for example, instances of one or more EASs 204, EESs 208, ECSs 212, or other servers within the EDN 206) associated with the common multi-user group ID.

Figure 13:
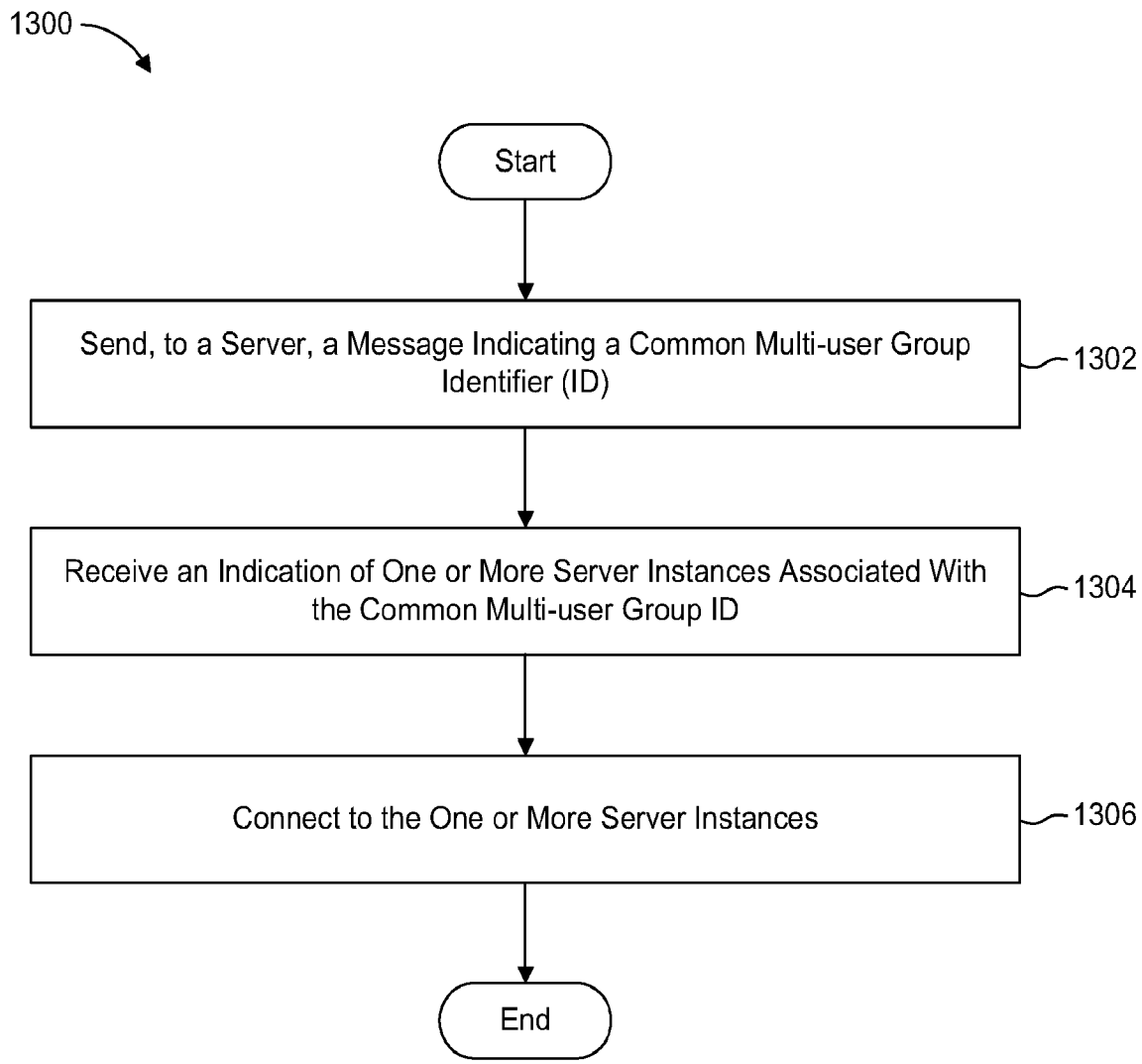
FIG. 13 is a flow diagram of an example of a method for accessing one or more server instances associated with a common application using an associated common multi-user group identifier (ID).

FIG. 13 is a flow diagram of an example of a method for accessing one or more server instances associated with a common application (such as a common application client 202) using an associated common multi-user group identifier (ID).

At 1302, a WTRU 203 sends, to a server, a message indicating a common multi-user group identifier. Examples of the server include an EES 208, an EAS 204, and an ECS 212, and examples of the message include an EAS discovery request, a service provisional request, a request for identifying one or more EAS instances associated with a common multi-user group ID, and a request for provisioning of one or more EES instances associated with the common multi-user group ID.

At 1304, the WTRU 203 receives an indication of one or more server instances associated with the common multi-user group ID. For example, the one or more server instances may be within the EDN 206 and may be one or more instances of one or more of the EASs 204, EESs 208, or ECSs 212.

And at 1306, the WTRU 203 connects to the one or more server instances.

Figure 14:
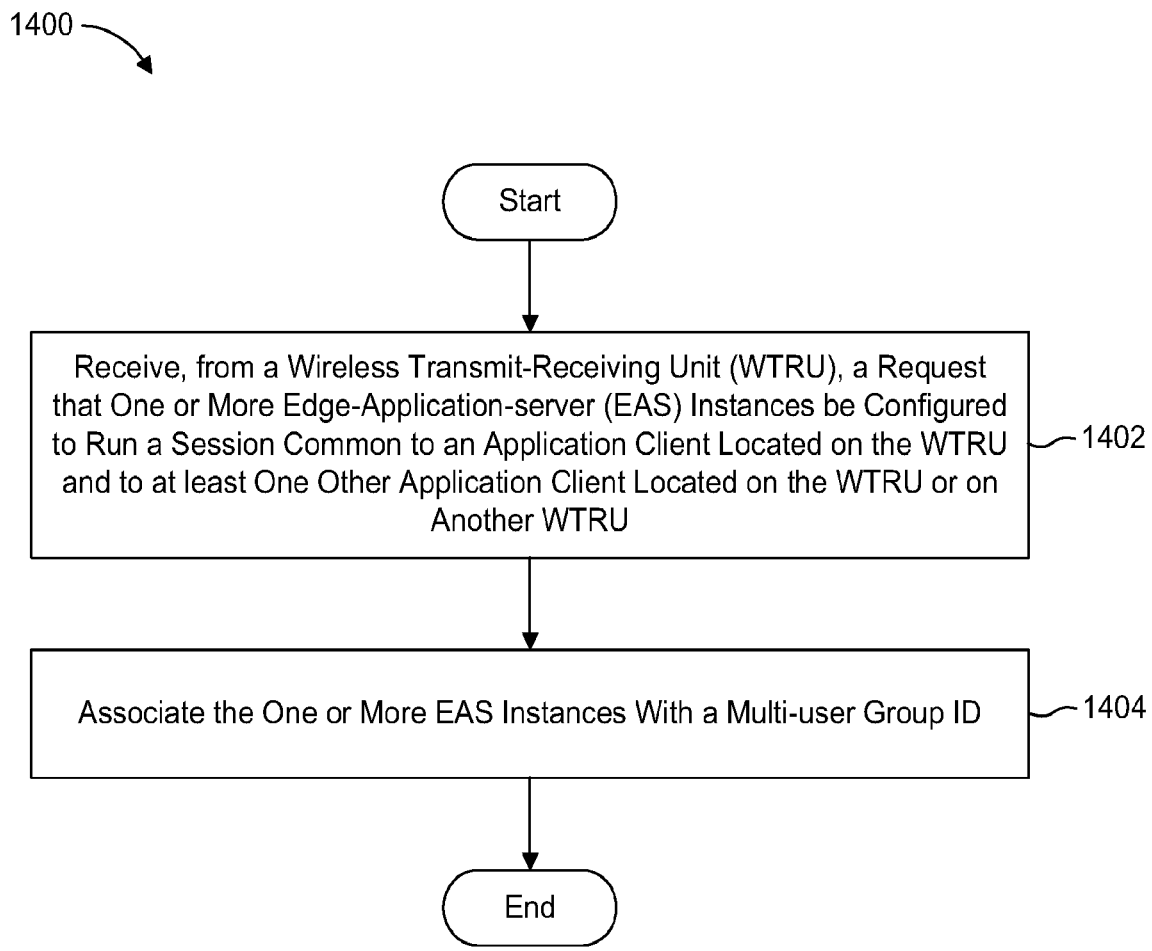
FIG. 14 is flow diagram of an example of a method for configuring one or more edge-application-server (EAS) instances to run a session common to multiple application clients on one or more WTRUs and to associate the one or more EAS instances with a multi-user group identifier (ID).

FIG. 14 is flow diagram of an example of a method for configuring one or more edge-application-server (EAS) instances to run a session common to multiple application clients on one or more WTRUs and to associate the one or more EAS instances with a multi-user group identifier (ID).

At 1402, a server receives, from a WTRU 203, a request that one or more EAS instances (e.g., instances of one or more of EASs 204) be configured to run a session common to an application client 202 located on the WTRU and to at least one other application client 202 located on the WTRU 203 or on another WTRU 203. The server may include one or more of an EAS 204, an EES 208, or an ECS 212 and be located within an EDN 206.

And at 1404, the server associates the one or the one or more EAS instances with a multi-user group ID.

As described herein, any description relating to an example, embodiment, and/or figure merely illustrates an example technique, and is not intended to be limiting in its description; further, it is intended that elements of a example, embodiment, and/or figure, such one or more steps of a process, may be reordered, made optional, and/or combined with elements of other figures.

As described herein, a higher layer may refer to one or more layers in a protocol stack, or a specific sublayer within the protocol stack. The protocol stack may comprise of one or more layers in a WTRU or a network node (e.g., eNB, gNB, other functional entity, etc.), where each layer may have one or more sublayers. Each layer/sublayer may be responsible for one or more functions. Each layer/sublayer may communicate with one or more of the other layers/sublayers, directly or indirectly. In some cases, these layers may be numbered, such as Layer 1, Layer 2, and Layer 3. For example, Layer 3 may comprise of one or more of the following: Non Access Stratum (NAS), Internet Protocol (IP), and/or Radio Resource Control (RRC). For example, Layer 2 may comprise of one or more of the following: Packet Data Convergence Control (PDCP), Radio Link Control (RLC), and/or Medium Access Control (MAC). For example, Layer 3 may comprise of physical (PHY) layer type operations. The greater the number of the layer, the higher it is relative to other layers (e.g., Layer 3 is higher than Layer 1). In some cases, the aforementioned examples may be called layers/sublayers themselves irrespective of layer number, and may be referred to as a higher layer as described herein. For example, from highest to lowest, a higher layer may refer to one or more of the following layers/sublayers: a NAS layer, a RRC layer, a PDCP layer, a RLC layer, a MAC layer, and/or a PHY layer. Any reference herein to a higher layer in conjunction with a process, device, or system will refer to a layer that is higher than the layer of the process, device, or system. In some cases, reference to a higher layer herein may refer to a function or operation performed by one or more layers described herein. In some cases, reference to a high layer herein may refer to information that is sent or received by one or more layers described herein. In some cases, reference to a higher layer herein may refer to a configuration that is sent and/or received by one or more layers described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a wireless transmit receive unit (WTRU), the method comprising:
   running an edge enabler client (EEC);
   sending, by the EEC, to a server, a message indicating a common multi-user group identifier (ID), wherein the message is a discovery request, wherein the server is one or more edge-enabler-servers (EES), wherein the EES is within an edge data network (EDN);
   receiving, by the EEC, an indication of one or more server instances associated with the common multi-user group ID, wherein the common multi-user group ID is representative of a same application being used by multiple WTRUs, wherein the one or more server instances are within the EDN, wherein the one or more server instances are one or more edge-application-server (EAS) instances; and
   connecting to the one or more server instances.

2. A WTRU, the WTRU comprising a processor operatively coupled to a transceiver,
   the processor and transceiver configured to run an edge enabler client (EEC);
   the processor and transceiver configured to send, by the EEC, to a server, a message indicating the common multi-user group identifier (ID), wherein the message is a discovery request, wherein the server is one or more edge-enabler-servers (EES), wherein the EES is within an edge data network (EDN);

the processor and transceiver configured to receive, by the EEC, an indication of one or more server instances associated with the common multi-user group ID, wherein the common multi-user group ID is representative of a same application being used by multiple WTRUs, wherein the one or more server instances are within the EDN, wherein the one or more server instances are one or more edge-application-server (EAS) instances; and the processor and transceiver configured to connect to the one or more server instances.

3. The method of claim 1, wherein the EEC receives the common multi-user group identifier (ID) from an Application Client (AC) running on the WTRU.

4. The WTRU of claim 2, wherein the EEC receives the common multi-user group identifier (ID) from an Application Client (AC) running on the WTRU.

5. The method of claim 1, wherein security information is associated with the common multi-user group ID.

6. The WTRU of claim 2, wherein security information is associated with the common multi-user group ID.

7. The method of claim 1, wherein the common multi-user group ID is representative of an application being used by multiple WTRUs.

8. The WTRU of claim 2, wherein the common multi-user group ID is representative of an application being used by multiple WTRUs.

9. The method of claim 1, wherein the message also includes an Application Client (AC) profile of an AC running on the WTRU.

10. The WTRU of claim 2, wherein the message also includes an Application Client (AC) profile of an AC running on the WTRU.

11. The method of claim 1, wherein the message also includes location information associated with the WTRU.

12. The WTRU of claim 2, wherein the message also includes location information associated with the WTRU.

13. The method of claim 2, wherein an Application Client (AC) running on the WTRU connects directly to the one or more server instances in the EDN through a 3GPP core network.

14. The WTRU of claim 1, wherein an Application Client (AC) running on the WTRU connects directly to the one or more server instances in the EDN through a 3GPP core network.

* * * * *